United States Patent
Dilmaghanian et al.

(10) Patent No.: US 9,234,591 B2
(45) Date of Patent: Jan. 12, 2016

(54) HIGH PRESSURE LIP SEALS WITH ANTI-EXTRUSION AND ANTI-GALLING PROPERTIES AND RELATED METHODS

(71) Applicant: BAL SEAL ENGINEERING, INC., Foothill Ranch, CA (US)

(72) Inventors: Farshid Dilmaghanian, Foothill Ranch, CA (US); Peter J. Balsells, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 0 days.

(21) Appl. No.: 14/216,895

(22) Filed: Mar. 17, 2014

(65) Prior Publication Data

US 2014/0265139 A1  Sep. 18, 2014

Related U.S. Application Data

(60) Provisional application No. 61/798,626, filed on Mar. 15, 2013.

(51) Int. Cl.
*F16J 15/16* (2006.01)
*F16J 15/32* (2006.01)

(52) U.S. Cl.
CPC ............ *F16J 15/3208* (2013.01); *F16J 15/166* (2013.01); *F16J 15/3204* (2013.01); *F16J 15/328* (2013.01); *F16J 15/3212* (2013.01); *F16J 15/3236* (2013.01)

(58) Field of Classification Search
CPC ..... F16J 15/32; F16J 15/3204; F16J 15/3208; F16J 15/3236
See application file for complete search history.

(56) References Cited

U.S. PATENT DOCUMENTS

| | | |
|---|---|---|
| 6,161,838 A | 12/2000 | Balsells |
| 2009/0146379 A1 | 6/2009 | Foster et al. |
| 2009/0289418 A1 | 11/2009 | Cook |
| 2010/0237565 A1 | 9/2010 | Foster |
| 2011/0140369 A1* | 6/2011 | Lenhert .................. 277/589 |
| 2012/0267858 A1 | 10/2012 | Rust |
| 2013/0043661 A1 | 2/2013 | Binder et al. |
| 2014/0265139 A1* | 9/2014 | Dilmaghanian et al. ...... 277/309 |

OTHER PUBLICATIONS

International Search Report on related PCT Application No. PCT/US2014/030673 from International Searching Authority (KIPO) dated Jul. 9, 2014.
Written Opinion on related PCT Application No. PCT/US2014/030673 from International Searching Authority (KIPO) dated Jul. 9, 2014.

* cited by examiner

*Primary Examiner* — Gilbert Lee
(74) *Attorney, Agent, or Firm* — Klein, O'Neill & Singh, LLP

(57) ABSTRACT

Sealing assemblies to provide sealing between a shaft and a housing comprising a sealing component comprising a body section as well as an outer flange and an inner flange both extending from said body section; a supporting component receiving said sealing component and comprising a relatively thick inner arm projecting into said sealing component and providing a supporting area spanning an inner portion of said body section and a portion of said inner flange; an anti-extrusion component engaged with said relatively thick inner arm; the minimum clearance between said anti-extrusion component and said shaft being less than the minimum clearance between said relatively thick inner arm and said shaft; said inner flange comprising a sealing area; wherein said sealing assembly is to be received in a cavity in said housing or on said shaft.

45 Claims, 10 Drawing Sheets

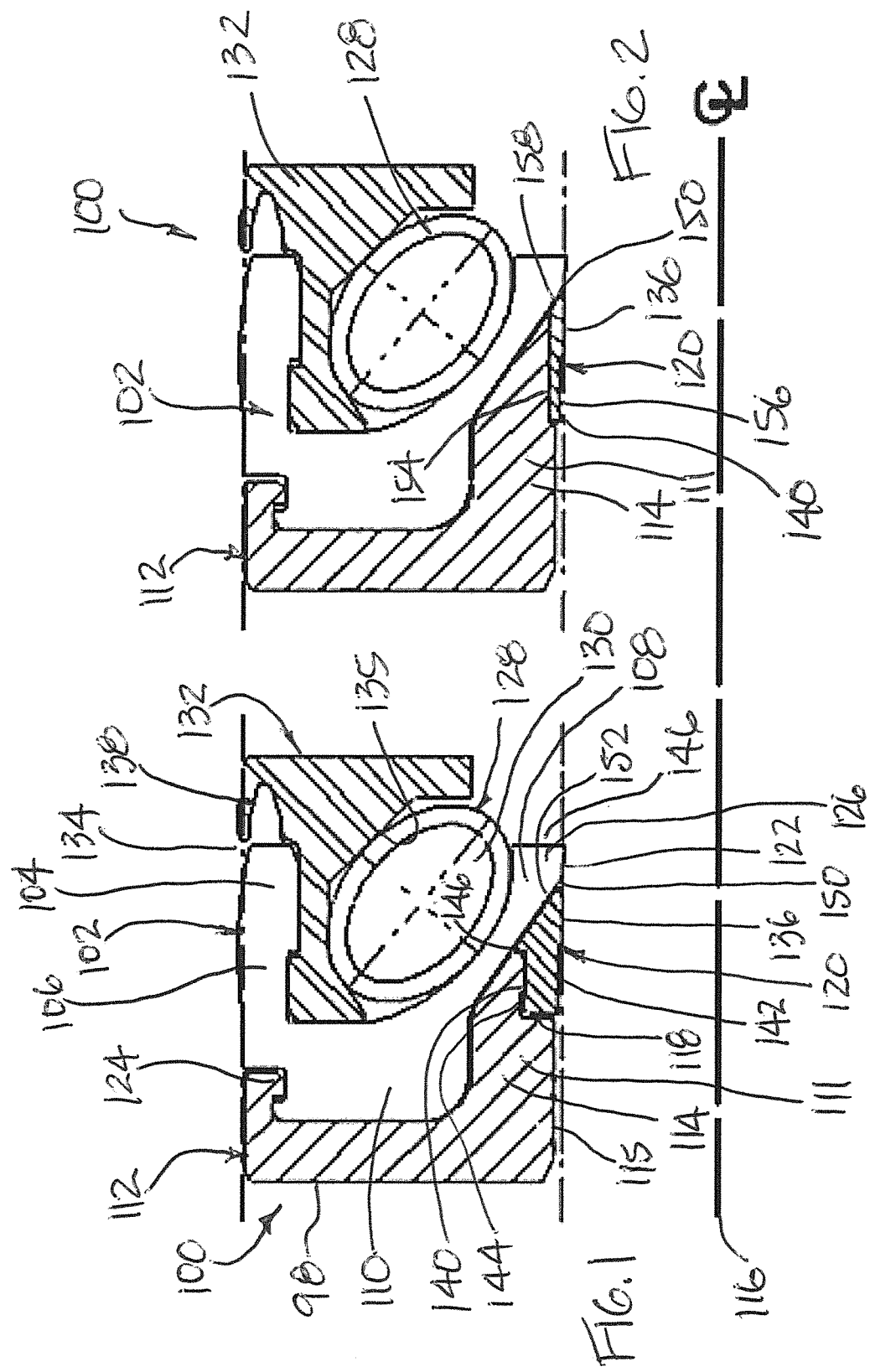

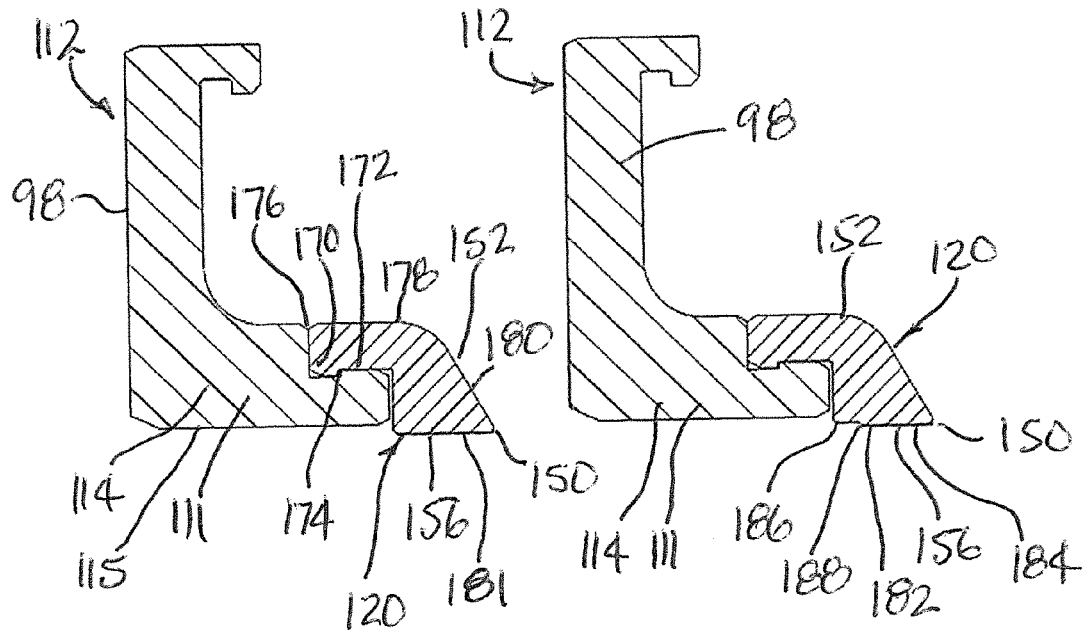

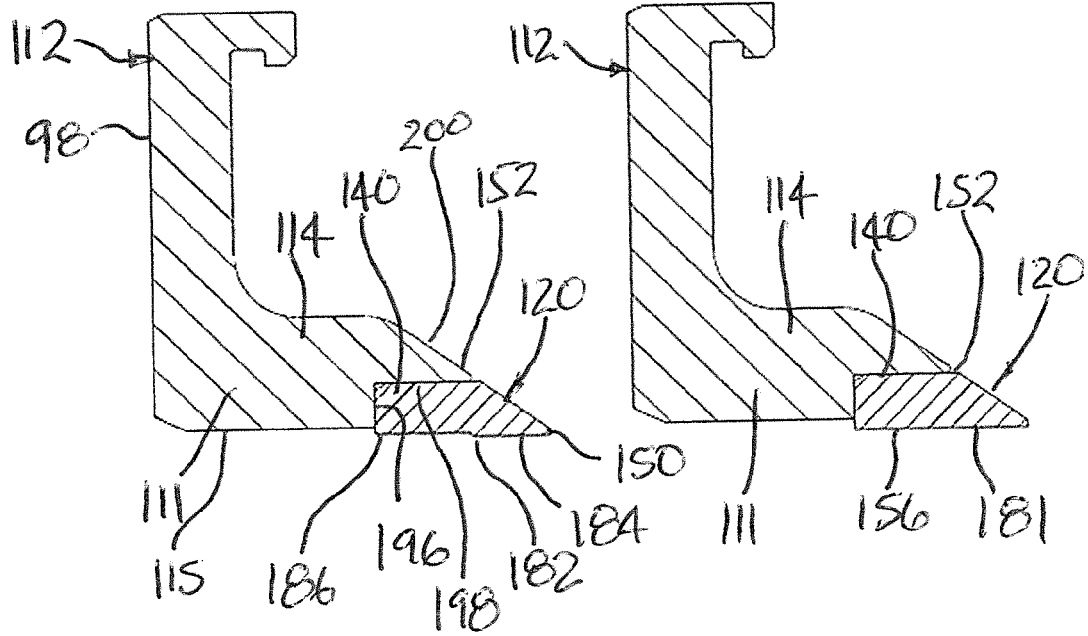

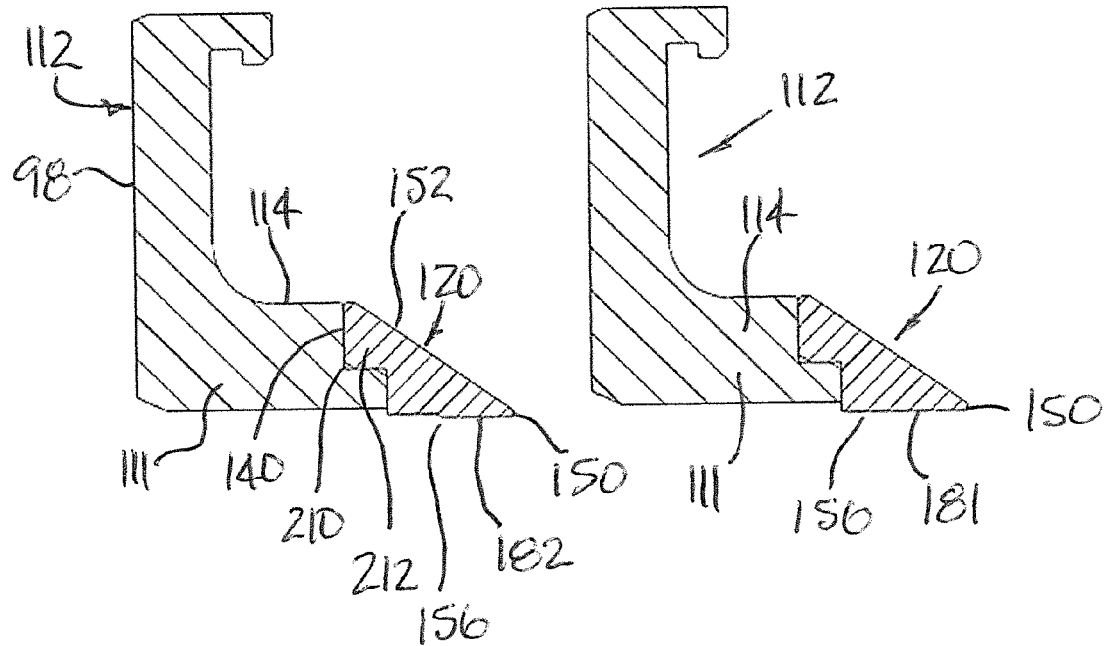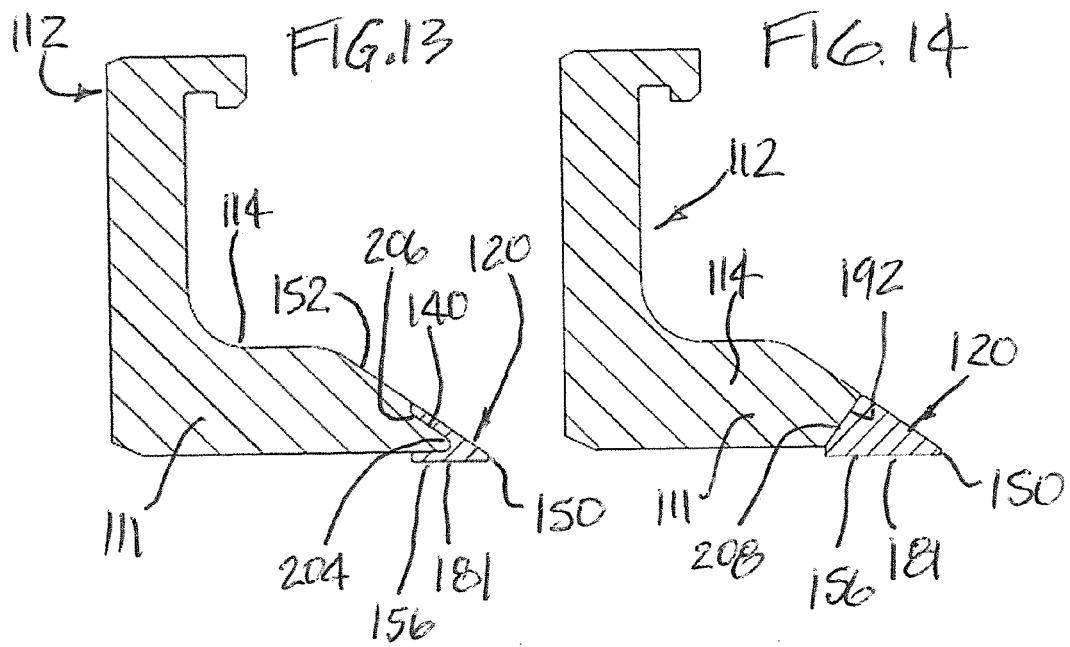

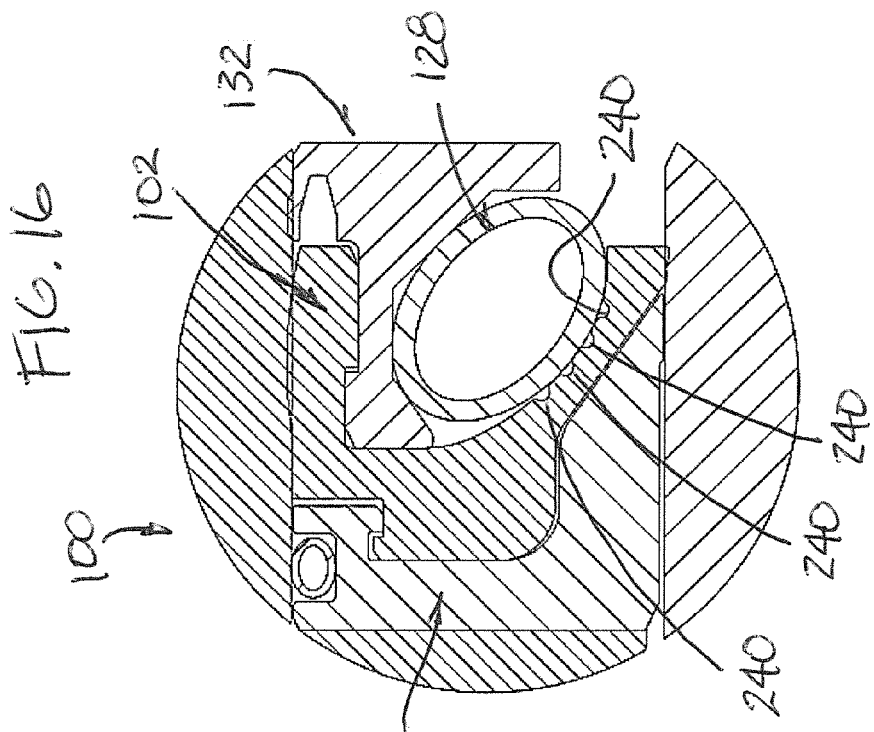
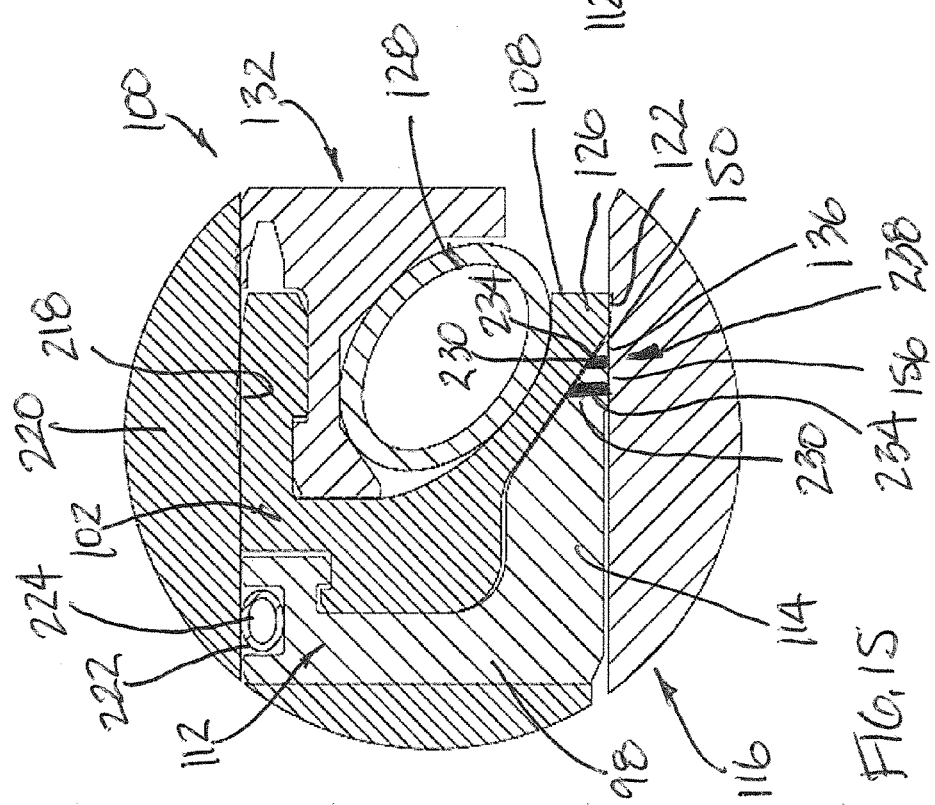

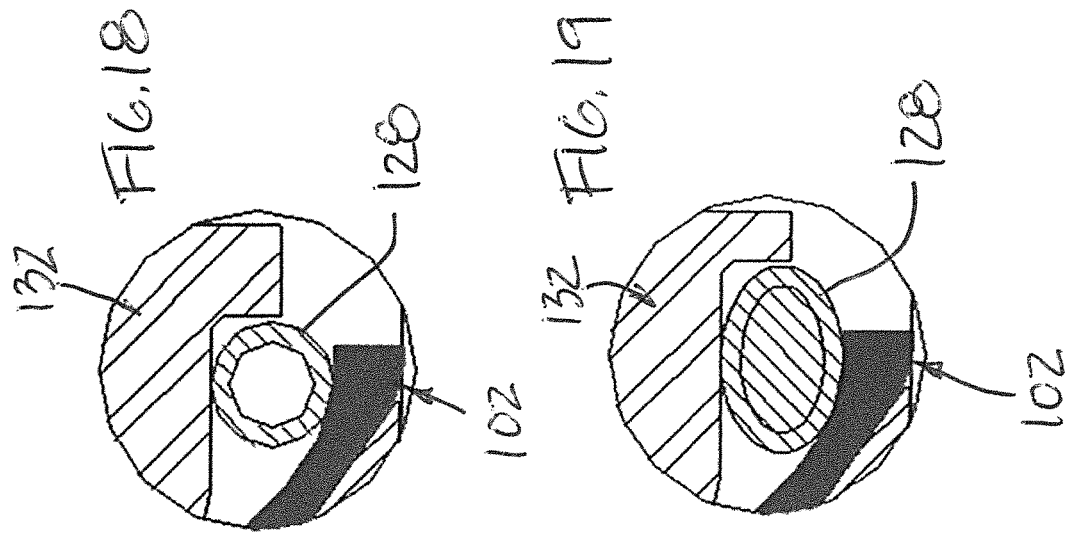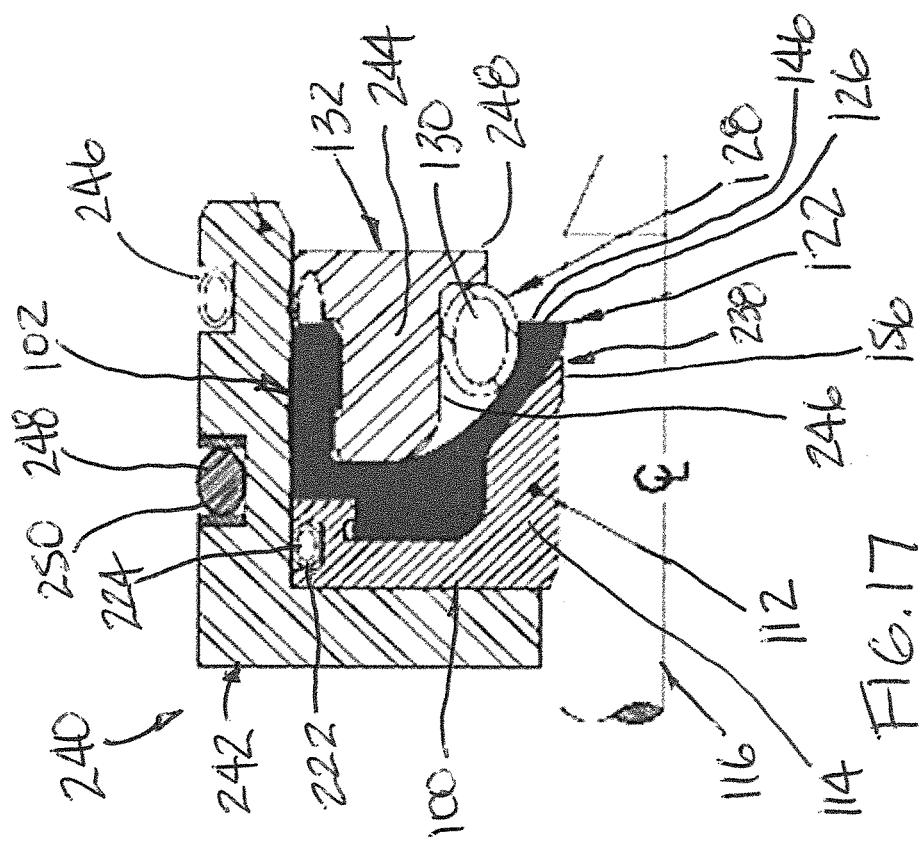

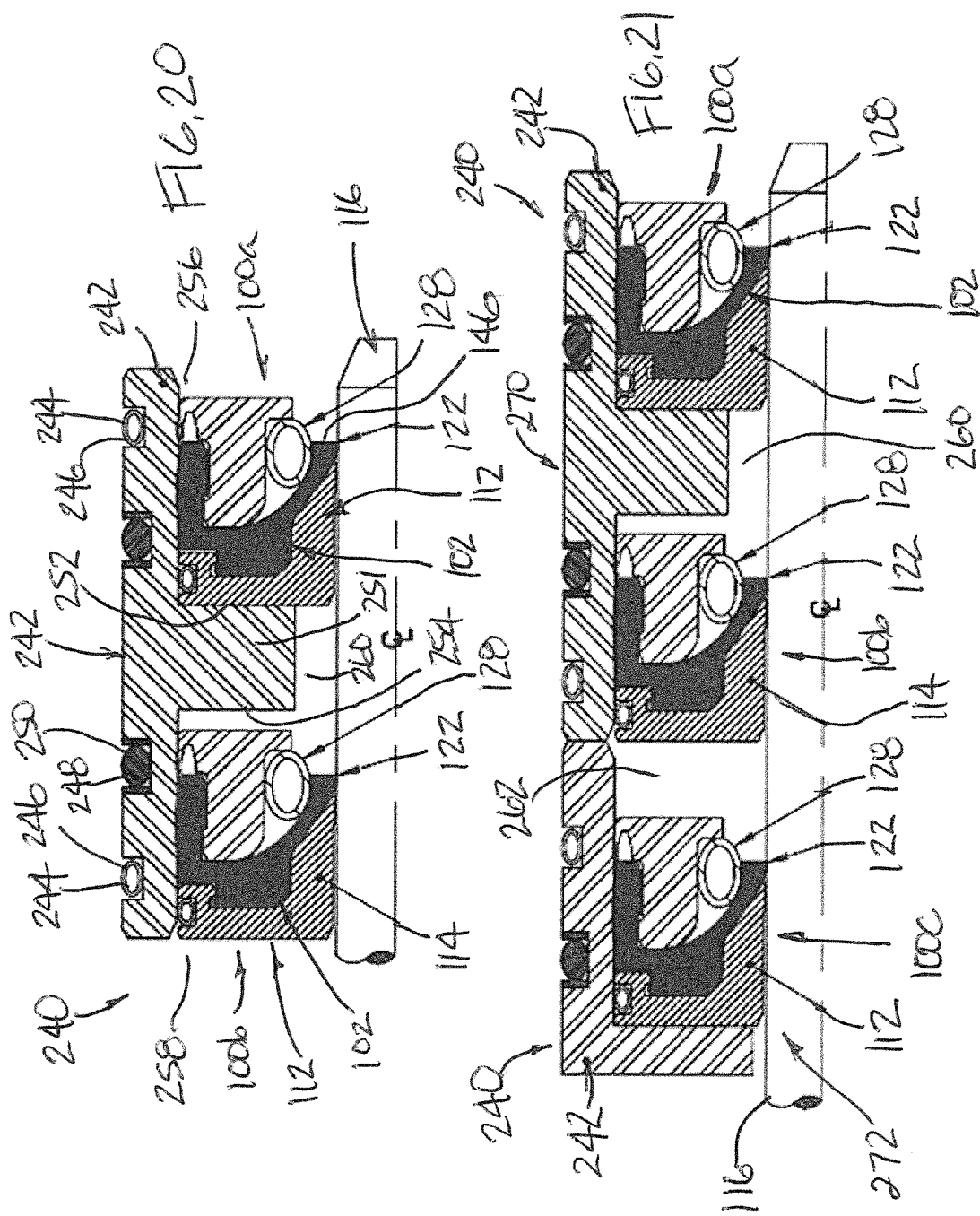

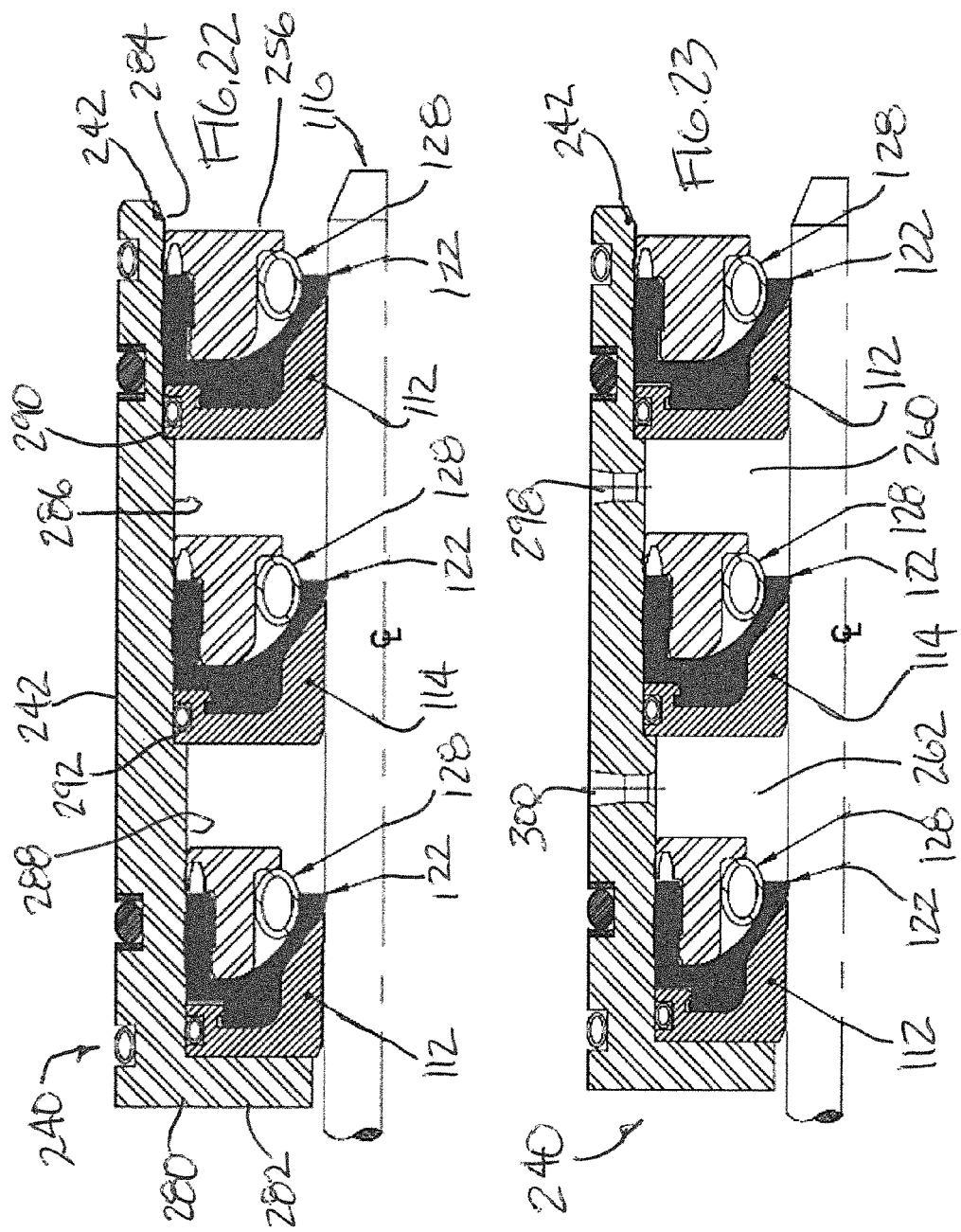

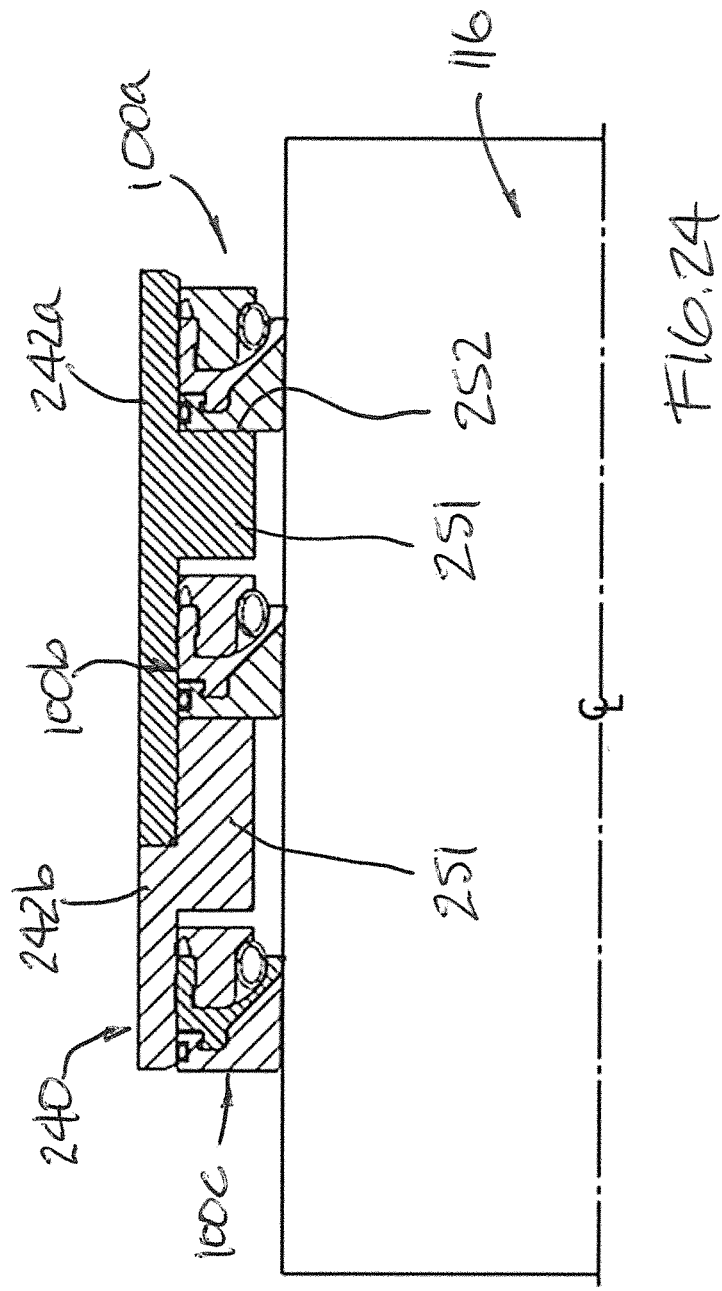

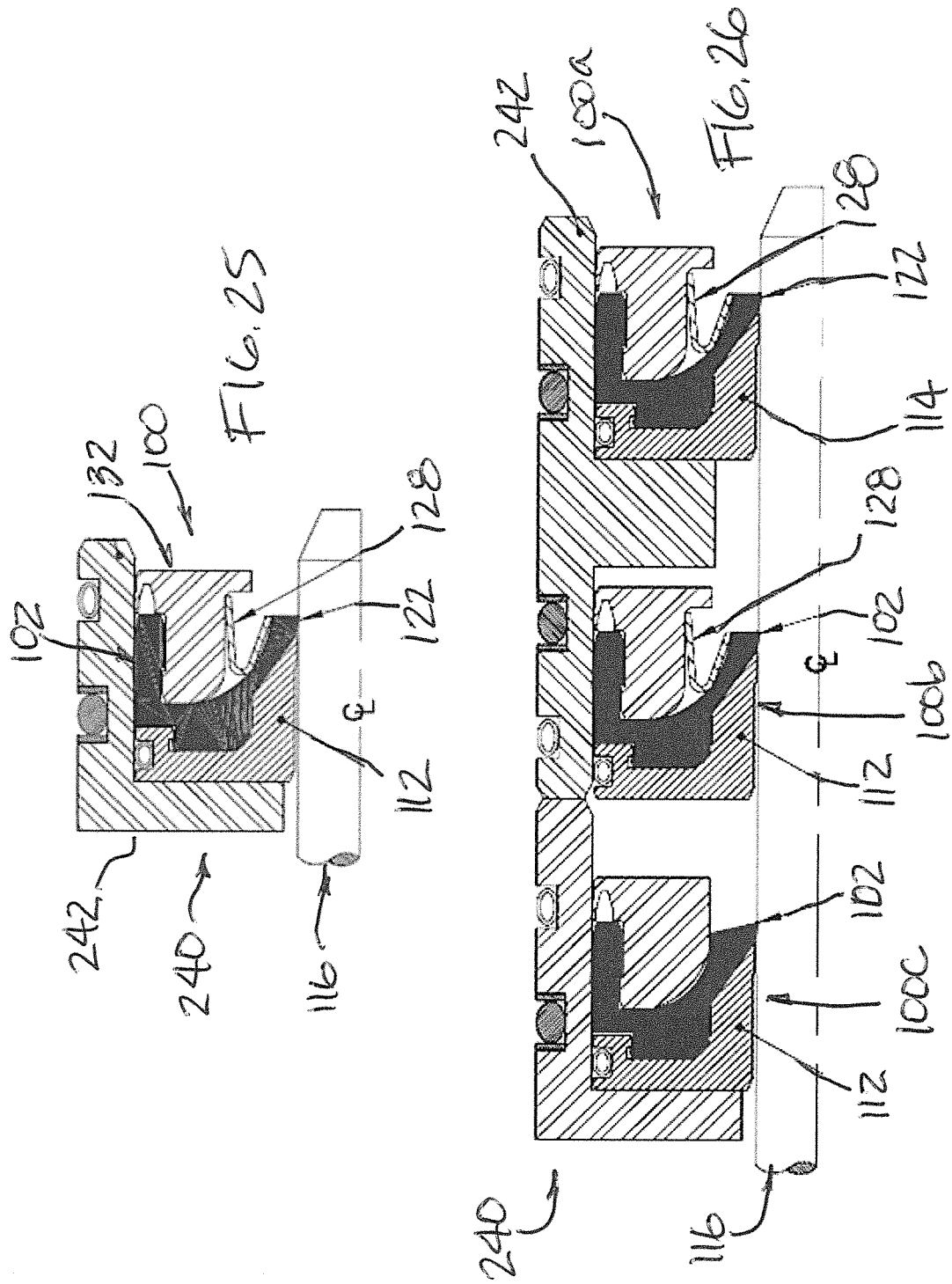

HIGH PRESSURE LIP SEALS WITH ANTI-EXTRUSION AND ANTI-GALLING PROPERTIES AND RELATED METHODS

FIELD

The present invention generally relates to apparatus, system, and method involving sealing assemblies for dynamic applications especially suitable for but not limited to sealing fluids and gases in higher pressure applications and related methods.

BACKGROUND

Extrusion is a phenomenon in sealing technology that affects the life of a seal, especially in dynamic applications. In particular, the sealing part of the seal assembly, such as the elastic seal lip, can be extruded during service due to the high pressure application that the seal attempts to seal against. The higher the media pressure, shaft speed and temperature, the more critical the extrusion becomes, and thus the more important it is to minimize the extrusion gap, that is, the clearance that exists between the shaft and the supporting means receiving the seal body. There are applications wherein such supporting means is a sidewall of the cavity receiving the seal body. In other applications, particularly in demanding dynamic applications, the supporting means essentially consists of a component comprising an area that receives the seal and made of a material that is less prone to extruding than the seal material, which is typically made from a non-metallic elastic material.

Some of the supporting components currently used comprise a portion generally extending below the heel and part of the sealing lip of the seal body. Due to demanding service conditions associated with dynamic applications where such supporting components may be used, they are to be made of a relatively high elastic modulus material, such as steel. At the same time, such demanding service conditions require a reduced extrusion gap, which may result in the inner surface of the referred portion of the supporting component touching the shaft due to excessive deflection under media pressure. However, a relatively high elastic modulus material may catastrophically damage the shaft if it touches the shaft due to deflection, vibration, or any other reason.

SUMMARY

The sealing solutions described herein allow for combining materials for a support or backing ring or component so that the supporting ring or component may be made of a relatively high elastic modulus material with at least a portion that is likely to touch the shaft under demanding service conditions made from a lower elastic modulus material, which may be an anti-galling relatively low elastic modulus material that will not ruin the shaft in case it touches it. In other examples, the part that may touch the shaft is provided with an integrated lubricating area 238, which can comprise a plurality of inserts to reduce the possibility of galling.

The ability of combining materials in the manner herein explained also allows for having reduced extrusion gaps without affecting the performance of the supporting component, which could happen if the entire supporting component would be made of relatively low elastic modulus material for anti-galling or reduced galling purposes but more prone to deflection due to being of a relatively lower modulus of elasticity.

The present application describes sealing assemblies to provide sealing between a shaft and a housing. They comprise a sealing component comprising a body section as well as an outer flange and an inner flange both extending from the body section. A supporting component receives the sealing component and comprises a relatively thick inner arm projecting into the sealing component that provides a supporting area spanning an inner portion of the body section of the sealing component and a portion of the inner flange. The sealing assemblies further comprise an anti-extrusion component engaged with the relatively thick inner arm. The minimum clearance between the anti-extrusion component and the shaft, that is, the extrusion gap, is less than the minimum clearance between the relatively thick inner arm and the shaft. The inner flange of the sealing component further comprises a sealing area that provides sealing between the shaft and such inner flange. The sealing assemblies are to be received in a cavity in the housing or on the shaft.

Aspects of the present disclosure can further include a sealing assembly to provide sealing between a shaft and a housing. In one example, the sealing assembly comprises a sealing component comprising a body section, an outer flange, and an inner flange both extending from said body section, said inner flange comprising a sealing area and a sealing lip. The sealing assembly further comprises a supporting component receiving said sealing component and comprising an inner arm comprising an inner arm stub projecting under said sealing component, said inner arm stub providing a supporting area spanning an inner portion of said body section and a first portion of said inner flange of said sealing component and comprises an inner arm edge and an anti-extrusion ring engaged to said inner arm stub, said anti-extrusion ring comprising an inner surface. Wherein said inner arm edge of said inner arm stub defining a first inside diameter and said inner surface of said anti-extrusion ring defining a second inside diameter, and wherein the second inside diameter is smaller than the first inside diameter so that when the sealing assembly is mounted on a shaft, said second inside diameter has a smaller clearance than said first inside diameter with the shaft.

The sealing assembly wherein said anti-extrusion ring can span a second portion of said inner flange of said sealing component.

The sealing assembly can further comprise a locking ring mechanically engaged with said outer flange of said sealing component.

The sealing assembly wherein said retaining component can comprise a spring lip.

The sealing assembly wherein said first portion of said inner flange can have a length and said second portion of said inner flange can have a length and wherein the two lengths can be equal.

The sealing assembly wherein said first portion of said inner flange can have a length and said second portion of said inner flange can have a length and wherein the length of said second portion can be less than the length of said first portion of said inner flange by at least 25%.

The sealing assembly wherein said anti-extrusion component and said inner arm stub can be engaged by a snap fit arrangement.

The sealing assembly wherein said anti-extrusion component and said inner arm stub can be engaged by a press fit arrangement.

The sealing assembly can further comprise a spring energizer energizing the sealing area.

The sealing assembly wherein said spring energizer can be a canted coil spring.

The sealing assembly wherein said canted coil spring can be a radial canted coil spring having a major axis turned at an angle with respect to a longitudinal axis of said sealing assembly.

The sealing assembly wherein said canted coil spring can contact said inner flange at an area where the inner flange is supported by both the inner arm stub and the anti-extrusion ring.

The sealing assembly wherein said spring energizer can be a cantilever spring, a ribbon spring, or a garter spring. A cantilever spring may also be referred to as a V-spring.

The sealing assembly wherein said anti-extrusion ring can be made from a plastic material.

The sealing assembly wherein said plastic can be a high temperature engineered plastic.

The sealing assembly wherein said anti-extrusion ring can be made of a relatively low elastic modulus metal, which has a lower elastic modulus value than that of the supporting component.

The sealing assembly wherein said relatively low elastic metal is one of bronze and bronze alloy.

The sealing assembly can further comprise a cartridge housing comprising a cavity and wherein the sealing assembly is positioned inside the cavity of the cartridge housing.

Yet another feature of the present disclosure is a sealing assembly to provide sealing between a shaft and a housing comprising a sealing component comprising a body section, an outer flange, and an inner flange both extending from said body section, said inner flange comprising a sealing area and a sealing lip; a supporting component made of a first material having a first modulus of elasticity value receiving said sealing component and comprising an inner arm projecting into said sealing component, said inner arm providing a supporting area spanning an inner portion of said body section and at least a portion of said inner flange; a locking ring engaging the outer flange of the sealing component and together with the sealing component defining an energizer cavity; a spring energizer disposed in the energizer cavity and biasing against the inner flange and the locking ring; wherein the inner arm has an inner arm edge defining a first inside diameter and a reduced clearance area defining a second inside diameter, which is smaller than the first inside diameter, and wherein the reduced clearance area has a second material having a second modulus of elasticity value, which is lower than the first modulus of elasticity value.

The sealing assembly wherein the reduced clearance area can be part of an anti-extrusion ring engaged to an inner arm stub of the inner arm.

The sealing assembly wherein the second material having the second modulus of elasticity value can comprise two or more inserts positioned inside two or more bores.

The sealing assembly wherein the two or more bores can be open ended at each end of each bore.

The sealing assembly wherein the two or more bores have at least one end of each bore that is closed.

The sealing assembly wherein said spring energizer can be a canted coil spring, a ribbon spring, a helical spring, or a V-spring.

The sealing assembly wherein said spring energizer can contact said inner flange at a portion of the inner flange that is supported by the inner arm and the reduced clearance area of the inner arm.

The sealing assembly wherein said anti-extrusion ring can be made of plastic.

The sealing assembly wherein said plastic can be a high temperature engineered plastic.

The sealing assembly wherein said anti-extrusion ring can be engaged to the inner arm stub by a snap fit or a press fit.

The sealing assembly can further comprise a cartridge housing comprising an interior cavity and wherein the sealing assembly is positioned inside the interior cavity of the cartridge housing.

The sealing assembly can further comprise a second sealing assembly positioned inside the interior cavity of the cartridge housing in series with the sealing assembly.

The sealing assembly wherein the second sealing assembly can comprise a sealing component comprising an inner flange having a sealing lip supported by an inner arm of a supporting component.

Yet a further aspect of the present disclosure can include a method for making a seal assembly. In some examples, the method can comprise: forming a sealing component comprising a body section, an outer flange, and an inner flange both extending from said body section, said inner flange comprising a sealing area and a sealing lip; placing a supporting component made of a first material having a first modulus of elasticity value in receiving arrangement with said sealing component, said supporting component comprising an inner arm projecting into said sealing component and providing a supporting area spanning an inner portion of said body section and at least a portion of said inner flange; placing a locking ring in engagement with the outer flange of the sealing component and forming an energizer cavity with said sealing component; placing a spring energizer in the energizer cavity and biasing the spring energizer against the inner flange and the locking ring; wherein the inner arm has an inner arm edge defining a first inside diameter and a reduced clearance area defining a second inside diameter, which is smaller than the first inside diameter, and wherein the reduced clearance area has a second material having a second modulus of elasticity value, which is lower than the first modulus of elasticity value.

The method wherein the reduced clearance area can be part of an anti-extrusion ring engaged to an inner arm stub of the inner arm.

The method wherein the second material having the second modulus of elasticity value can comprise two or more inserts positioned inside one or more bores.

The method wherein the two or more bores can be open ended at each end of each bore.

The method wherein the two or more bores can have at least one end of each bore that is closed.

The method wherein said spring energizer can be a canted coil spring, a ribbon spring, a helical spring, or a V-spring.

The method wherein said spring energizer can contact said inner flange at a portion of the inner flange that is supported by the inner arm and the reduced clearance area of the inner arm.

The method wherein said anti-extrusion ring can be made of plastic.

The method wherein said plastic can be a high temperature engineered plastic.

The method wherein said anti-extrusion ring can be engaged to the inner arm stub by a snap fit or a press fit.

The method can further comprise placing the seal assembly inside an interior cavity of a cartridge housing.

The method can further comprise placing a second sealing assembly inside the interior cavity of the cartridge housing in series with the sealing assembly.

The method wherein the second sealing assembly can comprise a sealing component comprising an inner flange having a sealing lip supported by an inner arm of a supporting component.

The method wherein the canted coil spring has a major axis and wherein the major axis is generally parallel with a lengthwise axis of the sealing assembly.

A still further feature of the present disclosure is a sealing assembly to provide sealing between a shaft and a housing comprising: a sealing component comprising a body section as well as an outer flange and an inner flange both extending from said body section; a supporting component receiving said sealing component and comprising a relatively thick inner arm projecting into said sealing component; said relatively thick inner arm providing a supporting area spanning an inner portion of said body section as well as a first portion of said inner flange; an anti-extrusion component unitarily formed with said relatively thick inner arm; the minimum clearance between said anti-extrusion component and said shaft being less than the minimum clearance between said relatively thick inner arm and said shaft; said inner flange comprising a sealing area interfering with said shaft; wherein said sealing assembly is to be received in a cavity in said housing or on said shaft.

The sealing assembly wherein said anti-extrusion component can span a second portion of said inner flange.

The sealing assembly can further comprise a retaining component mechanically engaged with said outer flange.

The sealing assembly wherein said retaining component can further mechanically engage with a bottom wall of said cavity.

The sealing assembly wherein said first and second portions of said inner flange can have about the same length.

The sealing assembly wherein the length of said second portion of said inner flange can be significantly less than the length of said first portion of said inner flange.

The sealing assembly can further comprise spring means energizing said sealing area.

The sealing assembly wherein said spring means can be a canted coil spring.

The sealing assembly wherein said canted coil spring can be a radial canted coil spring and its major axis is turned at an angle with respect to a longitudinal axis of said sealing assembly.

The sealing assembly wherein said canted coil spring can contact two separated areas of said inner flange.

The sealing assembly wherein said spring means can be a cantilever spring.

The sealing assembly wherein said spring means can be a ribbon spring.

The sealing assembly wherein said spring means can be a garter spring.

The sealing assembly wherein said anti-extrusion component can be made of plastic.

The sealing assembly wherein said plastic can be a high temperature plastic.

The sealing assembly wherein said anti-extrusion component can be made of a relatively low elastic modulus metal.

The sealing assembly wherein said relatively low elastic modulus metal is lubricated.

The sealing assembly wherein said relatively low elastic metal is one of bronze and bronze alloy.

The sealing assembly wherein said supporting component can be made of a relatively high elastic modulus material.

The present disclosure is further directed to a seal assembly as substantially shown and described.

Yet another feature of the present disclosure is a cartridge seal as substantially shown and described.

BRIEF DESCRIPTION OF DRAWINGS

These and other features and advantages of the present device, system, and method will become appreciated as the same becomes better understood with reference to the specification, claims and appended drawings wherein:

FIG. 1 shows a sealing assembly comprising a sealing component, a supporting component, an anti-extrusion component, an energizer to energize the sealing component, and a retaining component.

FIG. 2 shows another sealing assembly comprising a sealing component, a supporting component, an anti-extrusion component, an energizer to energize the sealing component, and a retaining component.

FIGS. 3-14 are cross-sectional side views of different supporting component embodiments that are usable in a seal assembly, such as the assemblies of FIGS. 1 and 2.

FIG. 15 shows an alternative sealing assembly comprising a sealing component, a supporting component, an anti-extrusion component, an energizer to energize the sealing component, and a retaining component.

FIG. 16 shows another alternative sealing assembly comprising a sealing component, a supporting component, an anti-extrusion component, an energizer to energize the sealing component, and a retaining component.

FIG. 17 shows cartridge seal assembly comprising a sealing assembly comprising a sealing component, a supporting component, an anti-extrusion component, an energizer to energize the sealing component, and a retaining component located in a cartridge housing.

FIG. 18 is a partial enlarged view of a seal assembly having an alternative spring energizer.

FIG. 19 is a partial enlarged view of a seal assembly having another alternative spring energizer.

FIG. 20 shows a cartridge seal assembly comprising two sealing components located inside a cartridge housing in series.

FIG. 21 shows a cartridge seal assembly comprising three sealing components located inside a cartridge housing in series. The cartridge housing comprises two different housing sections with a single unitary housing contemplated.

FIG. 22 shows a cartridge seal assembly comprising three sealing components located inside a single cartridge housing in series.

FIG. 23 shows a cartridge seal assembly comprising three sealing components located inside a single cartridge housing with ports for circulating fluids through the cartridge.

FIG. 24 shows a cartridge seal assembly comprising three sealing components located inside a cartridge housing in series. The cartridge housing comprises two different housing sections that are attached to one another, such as by threads.

FIG. 25 shows a cartridge seal assembly comprising a seal assembly with a cantilever spring or V-spring.

FIG. 26 shows a cartridge seal assembly comprising three sealing components located inside a two-part cartridge housing with a single unitarily formed housing contemplated. As shown, the third seal assembly does not utilize an energizer spring.

DETAILED DESCRIPTION

The detailed description set forth below in connection with the appended drawings is intended as a description of the presently preferred embodiments of sealing assemblies provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

FIG. 1 shows a sealing assembly 100 comprising a sealing component 102 comprising a body section 104 comprising an outer flange 106 and an inner flange 108 both extending from a center channel section 110 of the sealing component. The sealing component 102 may be made from thermoplastics like polytetrafluoroetyhlene (PTFE), nitrile rubber, hydrogenated acrylonitrile-butadiene rubber, carboxylated nitrile rubber, fluoro rubber and other elastic materials. The sealing assembly 100 is understood to be annular in configuration and has a bore for mounting over a shaft 116, which has a centerline, Ł. Thus, the sealing assembly has an outside diameter and an inside diameter. A supporting component 112 receives the sealing component 102 and comprises a back section 98 and a an inner arm 114, inner relative to a centerline of a shaft 116 and the outside atmosphere, which projects in the direction of the inner flange 108 of the sealing component 102. This inner arm 114 spans the inner portion of the center channel section 110 of the sealing component 102 and the inner flange 108. This arrangement allows the relatively softer and more flexible inner flange 108 of the sealing component to be supported against pressure by the relatively harder and more rigid inner arm 114. In some examples, the inner arm can be relatively thick, such as in girth, to reduce deflection. The relatively softer sealing component 102 is also supported by the supporting component 112 from extrusion due to the high service pressure acting on the sealing component 102 to tend to force the softer sealing body out any potential gap that is connected to a relatively lower pressure region. The inner arm 114 therefore has a tight tolerance or clearance with the shaft 116 to minimize the extrusion path to eliminate the potential for unwanted extrusion of the softer sealing component through the extrusion gap. At the same time, the inner arm 114 should be sufficiently stiff to resist deflection by the high pressure so as not to rub against the shaft during service.

In one example, the inner arm 114 is precision fabricated to maintain a tight tolerance with the shaft 116 to thereby minimize the extrusion path. The supporting component 112 should also made from a sufficiently stiff material in addition to being size with a sufficient width for the inner arm 114 to resist deflection. The supporting component 112 and specifically the inner arm 114 is configured support the sealing component from being extruded by the operating pressure that the seal assembly is positioned in during service. In the embodiment shown, an anti-extrusion component or ring 120 forms part of the support system of the inner arm 114 for supporting the sealing component. The anti-extrusion ring 120 has an inside diameter that can be precision fabricated to have a tight tolerance with the shaft and then connected to the inner arm stub 111 of the supporting component 112, such as in a snap fit or a pressed fit arrangement 118.

In one example, the inner arm stub 111 of the inner arm 114 can be fabricated with a sufficiently large gap between the inner edge 115 of the arm and the shaft 116 and the end where the anti-extrusion component 120 is located with a tighter tolerance with the shaft to minimize the potential extrusion path where the sealing component can be extruded by the working pressure. If the tolerance of the anti-extrusion component with the shaft is two thousandths of an inch, the clearance with the inner arm stub can be 75% larger or even greater. In the arrangement shown, both the sealing lip and the inner arm point in the direction of the higher pressure source. The inner arm stub 111 of the inner arm 114 supports a portion of the inner flange 108 while the anti-extrusion component 120 part of the arm 114 spans another portion of the inner flange 108 to support the sealing component 102 at a point closest to the leading sealing edge 148 with a tighter clearance. The length of the portions spanned by the inner arm stub 111 and the anti-extrusion component 120 under the center section 110 and the inner flange 108 of the sealing component are about the same. In other examples, the inner arm stub 111 extends a greater amount than the anti-extrusion component 120 part of the arm, which extends a smaller amount to support the inner flange 108 at or proximate the sealing lip 122. In still other examples, the anti-extrusion component 120 spans a greater amount than the inner arm stub 111. Thus, the sealing assembly 100 is understood to include an anti-extrusion component or ring, as the sealing assembly is annular, forming part of the inner arm 114 to support the inner flange 108 of the sealing component. The inner arm 114 can be fabricated by attaching the anti-extrusion component 120 to the inner arm stub 111 in a snap fit or press fit arrangement, which may also be referred to as a "pressed fit," which has some interference. Also shown is a press fit arrangement 124 proximate the intersection of the center body section 110 and the outer flange 106 between the support component 112 and the sealing component 102. The sealing component 102 is configured to compress and fit into the corresponding space in the support component 112.

The inner flange 108 of the sealing component 102 further comprises a reduced sealing area 126 having a sealing lip 122 for interfering with the shaft 116 to seal against the shaft. An energizer 128 is located in an energizer cavity 130 to bias the sealing lip 122 against the shaft. As shown, the energizer 128 is a radial canted coil spring comprising a major axis, i.e., the longer of two axes of the canted coils with the other being a minor axis, turned at an angle with respect to the longitudinal axis of the sealing assembly. In other examples, the energizer is an O-ring, an O-ring formed in combination with a canted coil spring, a V-spring, a helical spring, or a ribbon spring. The canted coil spring shown is received in the energizer space or cavity 130 defined by the sealing component 102 and a retaining component 132, which are mechanically engaged with one another via a snap fit arrangement. The retaining component 132 is mechanically engaged with the cavity wall 134 of the housing equipment, such as a seal cavity of a valve, a pump or other movable devices with axially movable pistons, which receives the sealing assembly 100. The retaining component 132 has a spring lip 138 adjacent a gap or void that flexes to press fit into the equipment housing, such as to the cavity wall 134 of the equipment housing. The energizer usable herein preferably touches other parts of the seal assembly at or near its minor axis so as to bias the inner flange 108 inwardly towards the shaft 112 and bias the retaining component 132 outwardly towards the equipment housing cavity wall 134. Specifically, the energizer 128 biases the inner flange 108 of the sealing component 102 to seal against the shaft 112 and against the anti-extrusion component 120 and the inner arm 114 of the supporting component 112. The energizer 128 also biases the retaining component 132 outwardly, which pushes against the outer flange 106 of the sealing component in the radial outward direction. When the energizer 128 is incorporated, the sealing lip 122 can continue to seal even when experiencing some wear due to the biasing force applied there against by the energizer, which will take up some of the worn material.

As shown, the spring energizer 128 is positioned in such a way relative to the energizer cavity 130 and the inner flange 108 to efficiently energize the sealing area 126. This allows for reduced sealing area 126 to have increased sealing stresses against the shaft. The reduced sealing area 126 may be better lubricated and cooled better due to its smaller size, which may be of particular interest to increase the life of the sealing assembly in certain applications.

When the spring energizer is a radial canted coil spring, turning the canted coil spring as shown in FIG. 1 may sometime be necessary due to geometry constraints, such as to reduce the overall profile and to make the seal assembly smaller, which requires the retaining component 132 or otherwise referred to as a locking ring, to adapt to the turning angle. For example, the inside surfaces 135 can be contoured to force the energizer 128 to rotate when the energizer is seated in the energizer cavity. Where space is not a constraint, the inside surfaces 135 may be modified so that the canted coil spring seats with its minor axis generally parallel to the shaft. Therefore, the use of a non-turned radial canted coil spring provides an alternative working assembly. In other examples, as further discussed below, the coil cross section of the canted coil spring is selected to cooperate with a relatively smaller energizer cavity so that the spring may operate in a non-turned position while still maintaining a smaller profile. In one example, the energizer cavity may be made smaller by increasing the thickness of the locking ring 132 so that the locking ring takes up more of the space of the energizer cavity.

The sealing area 126 with the sealing lip 122 is located adjacent the anti-extrusion component 120. Thus, the potential extrusion gap of the seal assembly 100 is the clearance gap 136 between the anti-extrusion component 120 and the shaft 116. In one example, the clearance gap 136 is about 1 thousandths to about 30 thousandths of an inch with about 2 thousandths to about 10 thousandths being more preferred. Normally a tolerance this type runs the risk of galling or scoring the shaft 116 if the inner arm 114 deflects due to vibration, pressure, or both. In the present embodiment, by splitting the inner arm into the inner arm stub 111 and the anti-extrusion ring 120, the anti-extrusion ring 120 may be made from a material that is less likely to gall the shaft and therefore can be made with a relatively tighter tolerance than prior art supporting component made entirely from a material with a high modulus of elasticity, such as stainless steel, which normally has to use a larger clearance with the shaft out of concern for scoring or galling the shaft. Thus with the use of anti-extrusion ring to form part of the inner arm 114 of the supporting component 112, even if the anti-extrusion ring 120 happens to deflect and rubs against the shaft 116, the likelihood of galling the shaft remains low because it is softer than the shaft material. By incorporating the anti-extrusion ring of the present disclosure, the clearance between the inner arm stub 111 and the shaft 116, i.e., the gap between the inner edge 115 of the inner arm stub and the shaft 116, can have a relatively larger value than the clearance gap 136 between the anti-extrusion ring and the shaft to minimize the potential for the harder material of the inner arm stub 111 to deflect and rub against the shaft. Further, the thickness of the inner arm stub 111 of the supporting component 112 is such that it reduces the amount of deflection of such inner arm when subjected to the expected media pressure, which, combined with a properly sized clearance between the inner arm stub 111 and the shaft 116, prevents the inner arm stub 111 from touching the shaft. For example, the inner arm stub 111 may be selected with a certain thickness along with material properties to minimize or eliminate deflection. Still further, the inner arm stub 111 to shaft 116 clearances can be sized to ensure that even with some deflection, it does not deflect or touch and gall the shaft. In one example, the clearance between the inner edge 115 of the inner arm stub and the shaft is about 2 times to about 50 times larger than the clearance between the anti-extrusion ring 120 and the shaft.

Therefore, apart from the sealing component 102, only the anti-extrusion component 120 is configured to safely touch the shaft under the expected media pressure without galling or scoring the shaft.

In one example, the anti-extrusion component 120 is made of an anti-galling material, such as, for example, a suitable high temperature plastic or a low elastic modulus metal, such as bronze or a bronze alloy, which has a lower hardness than a typical shaft material. Suitable high temperature plastic can be one of several engineered plastic, such as polyetheretherketone (PEEK), polycarbonates (PC), polyetherketone (PEK), polyethylene terephthalate (PET), and polyamides (PA). Still further, the anti-extrusion component 120 may be lubricated to reduce heat buildup and galling. For example, the anti-extrusion component 120 may be provided with lubricating inserts as further discussed below with reference to FIG. 15. The supporting component 112 may be made of a relatively high elastic modulus material, such as from stainless steel or other high modulus grade metals and metal alloys.

With reference to the engagement 118 between the inner arm stub 111 and the anti-extrusion component 120, a receiving cavity 140 is provided at an end of the inner arm stub 111 to receive an extended body section 142 of the anti-extrusion component 120. The receiving cavity 140 has a radial cavity wall 144 that fits over the outer surface of the extended body section 142. A shoulder 146 is provided on the anti-extrusion component to register the two components. In an alternative embodiment, the shoulder 146 is eliminated as the receiving cavity 140 has a vertical end wall that can limit and register the anti-extrusion component. In one example, the engagement 118 is a simple snap fit. In another example, the engagement is a pressed fit with some interference. The anti-extrusion ring further comprises a support surface 152. As shown, the support surface 152 can have a taper, a slant or an arcuate outer surface to match the profile of the lower outer surface of the inside flange 108 to support the inside flange of the sealing component 102. The shoulder 146 and the outer support surface 152 portion of the anti-extrusion component together resemble the head or tip of an arrow. A seam 176 is provided between the inner arm stub 111 and the anti-extrusion component 120 under the inner flange 108 and spaced from the center section 110 of the sealing component.

By incorporating the anti-extrusion ring 120, the clearance between the inner arm 114 and the shaft 116, i.e., the clearance gap 136, can be reduced over prior art seal assemblies that use a single high modulus supporting component to support the elastic seal body. This in turn allows the present seal assembly to operate in high pressure applications with a small clearance while still incorporates safety provisions for reduced shaft galling and/or scoring. Additionally, the leading tip 150 of the anti-extrusion ring 120 and the leading edge or tip 146 of the sealing area 126 can be reduced since the inner flange 108, and more specifically the sealing area 126, is properly supported without unnecessarily increasing the material thickness or bulk of the sealing area due to typical large clearance gap using a single high modulus material supporting component. Thus, as compared to prior art sealing assemblies without the present anti-extrusion ring, the width of the present sealing lip 122 measured between the leading edge 146 and the leading tip 150 can be reduced without sacrificing extrusion resistant capability. This in turn allows the relatively smaller sealing lip 122 of the present embodiment to exert a higher contact force against the shaft 116, due to the biasing force of the energizer 128 acting on the smaller sealing area 126, to provide superior sealing. By incorporating a smaller sealing lip 122 at the sealing area 126, the energizer 128 applies more force to the sealing lip compared to a sealing lip with a larger surface area.

Thus, an aspect of the present disclosure is understood to include a seal assembly for mounting on a shaft comprising a sealing component having an inside flange and an outside flange, a retaining component engaged to the outside flange and defining an energizer cavity with the sealing component, an energizer located in the energizer cavity and biasing the inside flange and the retaining component, and a supporting component engaging the sealing member, said supporting component comprising an inner arm supporting the inner flange and wherein said inner arm comprises an inner arm stub and an anti-extrusion ring comprising a bore. The sealing assembly wherein the inner arm can comprise a seam located under the inner flange of the sealing component. The sealing assembly wherein the anti-extrusion ring is made from a first material that differs from a second material used to form the inner arm stub. The first material can have a lower modulus of elasticity and therefore softer than that of the inner arm stub. The sealing assembly wherein the anti-extrusion ring can have a first clearance with the shaft and the inner arm stub can have a second clearance with the shaft and wherein the first clearance is smaller than the second clearance. The sealing assembly wherein the anti-extrusion ring and the inner arm stub can extend generally the same length or distance to support the sealing component.

For other seal assemblies and seal assembly components disclosed herein below, such as for other supporting components, it is understood that where a feature is shown but not expressly described and is otherwise the same or similar to the feature or features described elsewhere, such as above with reference to FIG. 1, the disclosed part or parts shown in the subsequent drawing figures but not expressly described because of redundancy and because knowledge is built on a foundation laid by earlier disclosures may nonetheless be understood to be described or taught by the same or similar features expressly set forth in the text for the embodiments in which the feature or features are described, such as for the seal assembly of FIG. 1. Said differently, subsequent disclosures of the present application are built upon the foundation of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

FIG. 2 illustrates a sealing assembly 100 provided in accordance with alternative aspects of the present disclosure. The present sealing assembly 100 is similar to the sealing assembly of FIG. 1 with a few exceptions. In the present embodiment, the anti-extrusion component 120 embodies a ring having a thin profile. As shown, the anti-extrusion component 120 of FIG. 2 comprises an outer surface 154 having a slight inclined taper in the direction of the leading tip 150 and an inner surface 156 that has a stepped surface. The outer inclined taper surface 154 is configured to snap fit into the recessed space or receiving cavity 140 of the inner arm 114. The stepped inner surface 156 has two different clearances relative to the shaft 116, as further discussed below with reference FIG. 4. Away from the tip 150, the clearance can be greater than the clearance closer to the tip 150 of the anti-extrusion ring 120. The stepped inner surface allows the anti-extrusion ring to support the sealing lip near the slanted edge 158 adjacent the leading tip 150 while still maintain a small line contact profile with the shaft, in the event deflection occurs and the stepped inner surface 156 contacts the shaft. As shown, the anti-extrusion ring 120 of FIG. 2 does not incorporate an arrow-like tip comprising a distinct shoulder.

The inner arm stub 111 of the inner arm 114 of the present assembly is somewhat similar to the inner arm 114 of FIG. 1 except the receiving cavity 140 is reduced in size to accommodate the smaller sized anti-extrusion ring 120 of FIG. 2. Further, because the receiving cavity 140 is relatively smaller, the inner arm stub has a greater girth compared to the inner arm stub of FIG. 1, which can make the inner arm of FIG. 2 stiffer and less prone to deflection. Still further, as the anti-extrusion ring is reduced in size, there is a greater surface area contact between the inner arm stub 111 and the inner flange 108 than between the anti-extrusion ring 120 and the inner flange 108.

As noted above, the anti-extrusion ring 120 of FIGS. 1 and 2 snap fit into the inner arm 114 of the supporting component 112. In some examples, the anti-extrusion ring does not snap fit into the receiving cavity 140 of the inner arm 114 but forms an integral part of it, which is understood to be different than a unitary part or unitarily formed part of the inner arm. This integration may be accomplished by multiple means. A first possible means consists of press fitting the anti-extrusion component and include an interference fit. A second possible means consists of layering this anti-extrusion component, which could be accomplished by, for example, molding it in place by using the inner arm stub 111 as part of the mold. A third possible means is a unitary construction and consists of having the anti-extrusion component unitarily formed with the inner arm and providing a separate anti-galling means to the close tolerance area, such as providing a plurality of inserts, as further discussed below with reference to FIG. 15.

With reference now to FIG. 3, an alternative supporting component 112 is shown, which has an inner arm 114 comprising an inner arm stub 111 and an anti-extrusion ring 120. The present alternative embodiment is usable with a sealing component, a retaining component, and an energizer to form a seal assembly, similar to that of FIGS. 1 and 2. The curvature of the inner arm 114 and the outer surface of sealing component (such as the sealing component 102 of FIGS. 1 and 2) can be adjusted to mate or match.

In the present embodiment, a receiving cavity 140 on the inner arm stub 111 is provided with an outer surface 170 comprising a detent 172 for engaging a corresponding detent 174 on the anti-extrusion component 120. The inner arm stub 111 and the anti-extrusion component 120 have a seam 176 therebetween where the two mate. The seam 176, when the supporting component 112 is mated with a sealing component, is configured to be located under and supporting the inner flange of the sealing component.

The support surface 152 on the anti-extrusion ring 120 is shown with two distinct sections, a generally horizontal section 178 and a steep slanted section 180 that extends towards the tip 150. However, the contour of the support surface 152, which spans the entire inner arm and includes potions formed by the inner arm stub and the anti-extrusion ring, can be adjusted or modified to match with the inside under surface of the sealing component that it is paired with. Because the supporting component 112 is annular in shape, the inner edge 115 shown represents the inside diameter of a bore. Similarly, the inner surface 156 of the anti-extrusion component 120 is also part of the same bore. However, the inner edge 115 of the inner arm stub 111 has an inside diameter that is larger than the inside diameter of the inner surface 156 of the anti-extrusion component, as explained above with reference to FIG. 1. This allows the anti-extrusion component to support the sealing component with minimal extrusion gap with the shaft while the inner arm stub 111 can have a larger gap with the shaft to prevent galling the shaft in the event there is unwanted deflection. The inner surface 156 of the anti-extrusion component is generally constant 181 so that in the event of a deflection the entire inner surface 156 may touch the shaft.

FIG. 4 is a cross-sectional view of an alternative supporting component 112 having a back section 98 and an inner arm 114 provided in accordance with aspects of the present disclosure. The present embodiment is similar to the embodiment of FIG. 3 with the exception of the inner surface 156 of the anti-extrusion ring 120. In the present embodiment, the inner surface 156 has a stepped surface 182, which has a smaller diameter section 184 near the tip 150 and a larger diameter section 186 away from the tip with a shoulder 188 located in between. The shoulder 188 can be a single sloped surface, a curved surface, or multiple short distinct surfaces. The stepped surface 182 is used as opposed to a generally constant surface 181 of FIG. 3 to reduce the line contact with the shaft in the event of a deflection, wherein only the smaller diameter section 184 will contact the shaft.

FIG. 5 is a cross-sectional view of an alternative supporting component 112 having a back section 98 and an inner arm 114 provided in accordance with aspects of the present disclosure. The present supporting component 112 is similar to the supporting component 112 of FIGS. 1-4 with the exception of the connection between the inner arm stub 111 and the anti-extrusion ring 120. In the present embodiment, the receiving cavity 140 comprises a slot 190 located at an axial end edge 192 of the inner arm stub 111 for receiving an axial ring 194 projecting out the end of the anti-extrusion ring 120. The connection between the slot 190 and the ring 194 can be a snap fit or a pressed fit.

The support surface 152 on the anti-extrusion component is shown with a single slope but can vary to accommodate any particular shape of the sealing component that the supporting component is paired with. The inner surface 156 has a stepped surface 182, which has a smaller diameter section 184 near the tip 150 and a larger diameter section 186 away from the tip with a shoulder 188 in located in between, similar to the stepped surface 182 of FIG. 4.

FIG. 6 is a cross-sectional view of an alternative supporting component 112 having a back section 98 and an inner arm 114 provided in accordance with aspects of the present disclosure. The present supporting component 112 is similar to the supporting component 112 of FIG. 4 with the exception of the inner surface 156 of the anti-extrusion ring 120, which has a generally constant surface 181, similar to the inner surface of FIG. 3.

FIG. 7 is a cross-sectional view of an alternative supporting component 112 having a back section 98 and an inner arm 114 provided in accordance with aspects of the present disclosure. The present supporting component 112 is similar to the supporting component 112 of FIGS. 1-6 with the exception of the connection between the inner arm stub 111 and the anti-extrusion ring 120. In the present embodiment, the receiving cavity 140, viewed in its annular configuration, comprises a bottom wall 196 and a sidewall 198 for receiving the anti-extrusion component 120, which may fit inside the receiving cavity in a snap fit or a pressed fit. The support surface 152 has a slanted surface 200 formed by both the inner arm stub 111 and the anti-extrusion ring 120.

Along the inside diameter, the inner surface 156 of the anti-extrusion ring 120 has a stepped surface 182, which is smaller in diameter than the inner edge 115 of the inner arm stub 111. Note that the larger diameter section 186 and the small diameter section 184 are both smaller than the inner edge 115 of the inner arm stub 111, which is also true for the embodiments of FIGS. 1-6. In some embodiments, the larger diameter section 186 of the stepped surface 182 is about the same as the inner edge 115 but the smaller diameter section 184 should be smaller to reduce the potential extrusion gap.

FIG. 8 is a cross-sectional view of an alternative supporting component 112 having a back section 98 and an inner arm 114 provided in accordance with aspects of the present disclosure. The present supporting component 112 is similar to the supporting component 112 of FIG. 7 with the exception of the inner surface 156 of the anti-extrusion ring 120, which has a generally constant surface 181, similar to the inner surface of FIG. 3.

FIG. 9 is a cross-sectional view of an alternative supporting component 112 having a back section 98 and an inner arm 114 provided in accordance with aspects of the present disclosure. The present supporting component 112 is similar to the supporting component 112 of FIG. 5 with the exception of the transition zone 202 between the inner arm stub 111 and the anti-extrusion ring 120, which has been shifted. Again, the support surface 152 has a slanted surface formed by part of the inner arm stub 111 and the anti-extrusion ring 120 with specific slant angle and contour modifiable to support any mating sealing component. Along the inside diameter, the inner surface 156 of the anti-extrusion ring 120 has a stepped surface 182, which is similar to that of FIG. 4.

FIG. 10 is a cross-sectional view of an alternative supporting component 112 having a back section 98 and an inner arm 114 provided in accordance with aspects of the present disclosure. The present supporting component 112 is similar to the supporting component 112 of FIG. 9 with the exception of the inner surface 156 of the anti-extrusion ring 120, which has a generally constant surface 181, similar to the inner surface of FIG. 3.

FIG. 11 is a cross-sectional view of an alternative supporting component 112 having a back section 98 and an inner arm 114 provided in accordance with aspects of the present disclosure. The present supporting component 112 is similar to the supporting component 112 of FIGS. 1-10 with the exception of the connection between the inner arm stub 111 and the anti-extrusion ring 120. In the present embodiment, the receiving cavity 140 comprises an open stepped surface 210 for mating engagement with a corresponding stepped surface 212 on the anti-extrusion ring 120. The engagement can be snap fit or a pressed fit.

The support surface 152 on the anti-extrusion component is shown with a single slope but can vary to accommodate any particular shape of the sealing component that the supporting component is paired with. The inner surface 156 has a stepped surface 182, which has a smaller diameter section near the tip 150 and a larger diameter section away from the tip with a shoulder located in between, similar to the stepped surface 182 of FIG. 4.

FIG. 12 is a cross-sectional view of an alternative supporting component 112 having a back section 98 and an inner arm 114 provided in accordance with aspects of the present disclosure. The present supporting component 112 is similar to the supporting component 112 of FIG. 11 with the exception of the inner surface 156 of the anti-extrusion ring 120, which has a generally constant surface 181, similar to the inner surface of FIG. 3.

FIG. 13 is a cross-sectional view of an alternative supporting component 112 having a back section 98 and an inner arm 114 provided in accordance with aspects of the present disclosure. The present supporting component 112 is similar to the supporting component 112 of FIGS. 1-12 with the exception of the connection between the inner arm stub 111 and the anti-extrusion ring 120. In the present embodiment, the receiving cavity 140 is provided in or with the anti-extrusion component 120 for capping an end joint 204 on the inner arm stub 111. The inner arm stub 111 comprises a recessed section 206 for receiving part of the anti-extrusion component 120 and to maintain a flushed support surface 152 to support an underside of the sealing component. The support surface 152 on the anti-extrusion component is shown with a single slope but can vary to accommodate any particular shape of the sealing component that the supporting component is paired with. The inner surface 156 has a generally constant surface 181, similar to the inner surface of FIG. 3.

FIG. 14 is a cross-sectional view of yet another alternative supporting component 112 having a back section 98 and an inner arm 114 provided in accordance with aspects of the present disclosure. The present supporting component 112 is similar to the supporting component 112 of FIGS. 1-13 with the exception of the connection between the inner arm stub 111 and the anti-extrusion ring 120. In the present embodiment, the inner arm stub 111 has a slanted axial end edge 192 for abutting a slanted axial end edge 208 on the anti-extrusion component 120. Preferably, the slanted axial end edge 208 of the anti-extrusion ring is such that the inner surface 156 is made longer by the slant as opposed to shorter if the slant had a reverse angle. The support surface 152 on the anti-extrusion component 120 is shown with a single slope but can vary to accommodate any particular shape of the sealing component that the supporting component is paired with. The inner surface 156 has a generally constant surface 181, similar to the inner surface of FIG. 3.

One of the main features of the present device, system, and method is to provide a reduced extrusion gap between the inner arm 114 of the supporting component 112 and the shaft 116 to reduce the potential pathway for the sealing component 102 to be extruded by the working pressure that the seal assembly operates under. While common prior supporting components can also support a sealing component, they are seldom if ever designed to have a reduced extrusion gap out of concern for scoring or galling the shaft. By incorporating the anti-extrusion component 120 of the present disclosure, the clearance gap can be reduced without fear of scoring or galling the shaft while still having the benefit of a strong inner arm 114 on the supporting component 112 that resists deflection. The anti-extrusion component 120 is a means for not damaging the shaft 116 in those cases where the media pressure may bend the inner arm 114 of the supporting component 112 enough for the anti-extrusion component to touch the shaft. Moreover, the anti-extrusion component has a reduced length, such as the inner surface 156 being of reduced length, in order to minimize the heat generated when this occurs.

With reference now to FIG. 15, a schematic cross-sectional side view of an alternative seal assembly 100 is shown. The present seal assembly 100 comprises a seal component 102 supported by a supporting component 112, a locking ring 132 to retain the assembly inside the cavity 218 of an equipment housing 220, and a biasing spring 128 to bias the inside flange 108 radially inwardly against the shaft 116 and the locking ring 132 outwardly towards the equipment housing 220. The present seal assembly 100 is similar to the seal assembly of FIGS. 1 and 2 with the following exception. In the present embodiment, the supporting component incorporates a groove 222 and has an energizer 224 located therein. The energizer 224 biases against the equipment housing 220 and the bottom of the groove 222. As shown, the energizer 224 is a radial canted coil spring. However, other spring types are also usable, such as a V-spring, a ribbon spring, and an energized O-ring. The energizer 224 is incorporated to facilitate with centering the seal assembly relative to wall of the cavity 218. In an alternative embodiment, the second energizer 224 and the groove 222 are omitted.

Another difference is the absence of a separate anti-extrusion component although one of the disclosed supporting components can be incorporated. In the present embodiment, the supporting component 112 is a unitary design with an inner arm 114 that extends to the tip 150 made from the same material, such as the same high modulus material like stainless steel, titanium alloy, chromium steel, nickel steel, etc., usable to make a supporting component of the present disclosure. The clearance gap 136 of the present embodiment can be tight, similar to the embodiments of FIGS. 1 and 2 with the anti-extrusion ring, and the sealing area 126 and sealing lip 122 small by extending the tip 150 further under the inner flange 108, also similar to the embodiments of FIGS. 1 and 2. The close tolerance 136 of the present embodiment is enabled by incorporating a solid lubricating feature. In one example, a plurality of bores 230 are provided in the inner arm 114 near the tight tolerance area 232 with the shaft. For example, two or three rows of bores 230 along the circumference of the inner arm near the tight tolerance area 232 can be provided. The hole locations can be also staggered or randomly placed near the tight tolerance area 232 of the inner arm 114. The number of holes and the number of rows depend on the bore of the seal assembly, i.e., for fitting around a shaft, and on the tolerance or gap designed for the particular application. The number also depends on the material used for the supporting component, the girth of the inner arm 114, and the inner surface 156 size that may contact the shaft due to deflection. The number can also depend on the type of solid lubricant placed inside the holes as wells as the diameter of the holes.

In one example, a plurality of inserts 234 are placed inside the plurality of holes or bores 230. The inserts 234 provide lubricating properties for the supporting component 112 in the event of a deflection and the inner surface 156 of the inner arm 114 contacts the shaft 116. The inserts 234 have a much lower modulus values than the value of the material used to make the supporting component 112. In one example, the inserts 234 are made from a soft metal material, such as brass, bronze, copper, or their alloys. The inserts can also be made from a polymer material, such as PTFE, or from plastics, such as PC, PEEK, etc. The inserts can be molded directly into the bores 230. For discussions that follow, the area of the inner arm 114 with the solid lubricating feature provided by the inserts may be referred to as an integrated lubricating area 238. In some examples, the holes or bores 230 are not completely formed through the inner arm. In other words, only the section of the inner arm that faces the shaft can include openings for accommodating the inserts while the opposite ends are closed.

Thus, an aspect of the present disclosure is understood to include a seal assembly comprising a unitarily formed supporting component having an inner arm for supporting a sealing component and wherein the inner arm has a reduced or tight tolerance area having a plurality of inserts made from a different material. The inserts provide needed lubrication in the event the supporting component deflects and touches a shaft or piston during service.

With reference now to FIG. 16, a schematic cross-sectional side view of an alternative seal assembly 100 is shown. The present seal assembly 100 is similar to the seal assembly of FIG. 15 with the following exception. In the present embodiment, a plurality of annular grooves, channels or recesses 240 are formed on the inner flange 108 of the sealing component 102 to help carry away heat. The channels 240 add surface areas to the sealing component 102 to increase surface area contact with the fluid media inside the equipment housing. This allows the fluid media to dissipate heat from a larger area of the sealing component to facilitate with cooling the sealing lip 122. The recesses 240 may be incorporated in any of the sealing components 102 discussed elsewhere herein.

FIG. 17 shows a seal cartridge 240 comprising a sleeve housing or cartridge housing 242 having a seal assembly 100 located therein. The seal assembly is installed in the cartridge housing and the entire seal cartridge 240 is configured to be installed over a shaft 116 and inside a cavity of an equipment housing. The cartridge housing 242 comprises a first groove 244 having a biasing element 246, such as a canted coil spring, and a second groove 248 having an O-ring 250 located therein. The O-ring is provided to seal the gap between the cartridge housing 242 and the equipment housing. The biasing element 246 is provided to center the cartridge housing to the cavity of the equipment housing. In alternative embodiment, the seal assembly 100 is sized and shaped to be installed directly into the cavity of the equipment housing without the cartridge housing.

As shown, the seal assembly 100 comprises a seal component 102 supported by a supporting component 112, a locking ring 132 to retain the assembly inside the cartridge housing 242, and a biasing spring 128 to bias the inside flange 108 radially inwardly against the shaft 116 and the locking ring 132 outwardly towards the cartridge housing 242. The locking ring 132 has a spring lip for pressing against the interior surface of the cartridge housing. The present seal assembly 100 is similar to the seal assembly of FIGS. 15 and 16 with a few exceptions. In the present seal assembly is energized by spring means consisting of a radial canted coil spring 128 that is un-turned, i.e., the minor axis is generally orthogonal to the axis of the shaft 116. For the canted coil spring 128 to remain un-turned, the locking ring 132 is modified by enlarging the body section 244 and leveling the interior wall surface 246 to modify the energizer cavity 130. Additionally, a lip 248 is provided to capture the spring energizer within the energizer cavity.

A further feature of the present embodiment is the recognition of and selection of a canted coil spring size in combination with an energizer cavity in which the spring minor axis is approximately aligned with or coincident with the leading seal edge 146 of the sealing component 102. As shown, part of the spring energizer 128 extends past the leading seal edge 146 and does not touch any part of the inner flange. In this configuration, the spring energizer 128 efficiently biases directly over the sealing lip 122 to ensure optimum sealing efficiency with the shaft. Thus, the sealing area 126 can remain relatively small. Although not shown, the inner arm 114 can be provided with a close tolerance by incorporating an integrated lubricating area 238 similar to that of FIG. 15 near the inner surface 156 of the inner arm 114.

In an alternative embodiment, seal assemblies in which an anti-extrusion ring is used with an inner arm stub discussed elsewhere herein may be used with the cartridge seal assembly of the present embodiment. Seal assemblies with anti-extrusion rings may also be used in series in a two seal cartridge or a three seal cartridge, as further discussed below with reference to FIGS. 20-24 and 26.

FIG. 18 shows a partial cross-sectional view of an alternative embodiment of FIG. 17. In the present embodiment, the spring energizer 128 may be a ribbon spring.

FIG. 19 shows a partial cross-sectional view of an alternative embodiment of FIG. 17. In the present embodiment, the spring energizer 128 may be a polymer filled radial canted coil spring. In a specific example, the energizer 128 is a silicone filled radial canted coil spring.

FIG. 20 shows a seal cartridge 240, which may also be called a cartridge seal, cartridge seal assembly, or a seal cartridge assembly, comprising a sleeve housing or cartridge housing 242 having two seal assemblies 100 located therein, which include a first seal assembly 100a and a second sealing assembly 100b. The entire seal cartridge 240 is configured to be installed over a shaft 116 and inside a cavity of an equipment housing. The cartridge housing 242 comprises two spring grooves 244 having a biasing element 246 located in each, which can be radial canted coil springs, and two sealing grooves 248 having an O-ring 250 located in each groove. In the embodiment shown, the cartridge housing 242 has a protruding or reinforcing wall 251 having a first reinforcing surface 252 and a second reinforcing surface 254. The cartridge housing 242 further comprises two open ends 256, 258 for installing the two seal assemblies 100 (100a, 100b) inside the cartridge housing with the two locking rings 132 of both seal assemblies having spring lips that bias directly against the interior wall surface of the cartridge housing. In an alternative embodiment, the two seal assemblies 100 are sized and shaped to be installed directly into the cavity of the equipment housing without the cartridge housing 242.

As shown, the seal assemblies 100 are similar to the seal assembly of FIG. 17 with a few exceptions. In the present embodiment the first sealing assembly 100a is backed by the reinforcing wall surface 252 of the protruding wall 251. The protruding wall 251 in the middle of the cartridge housing 242 helps the first sealing assembly 100a withstand media pressures and prevent it from sliding or pushed towards the second seal assembly 100b by the media pressure. In one embodiment, the sealing component 102 of the first sealing assembly 100a is made of a thermoplastic material, such as PEEK or other hard engineered plastics as opposed to a soft elastic material such as PTFE or rubber. The harder thermoplastic material allows the first sealing assembly to operate in and withstand abrasive media, such as mud or other slurry products. By configuring the minor axis of the canted coil spring 128 directly over the leading seal edge 146 of the sealing component 102, the primary seal 100a can seal against the shaft 116 even though it is made from a relatively more rigid sealing material than typical polymer-based elastic sealing material. The abrasion resistance characteristic of the primary seal 100a, made from a relatively more rigid thermoplastic material, is superior across a larger temperature range and is known to perform well at both lower temperatures and higher temperatures.

The second seal assembly 100b incorporates a sealing component 102 made of a PTFE based material or the like, which has reduced abrasion resistance but increased sealing ability due to its pliability compared to a more rigid material. In applications where the sealing cartridge 240 seals mud based media and is subjected to high pressure and high temperature, the first sealing assembly 100a is configured to prevent abrasive mud particles from reaching and thus damaging the second sealing assembly 100b. Thus, the first seal assembly 100a acts as a barrier for the second seal assembly 100b. Other material combinations are possible, including using the same material in both sealing assemblies 100a, 100b. Further, the space 260 between the two sealing assemblies 100a, 100b may be filled with lubricant to maintain the second sealing assembly 100b in a lubricated clean non-abrasive environment. For example, an external lubricant source may be piped into the seal chamber and provide fluid in the space 260 between the two sealing assemblies.

The seal assemblies of the present embodiment may also incorporate an anti-extrusion ring 120 or alternatively an integrated lubricating area 238 similar to that of FIG. 15.

FIG. 21 shows a seal cartridge 240 similar to that of FIG. 20 but further comprises a third sealing assembly 100c. As shown, the present seal cartridge assembly 240 comprises a first seal cartridge 270 and a second seal cartridge 272 mounted in series. The first seal cartridge 270 is similar the two seal assembly cartridge 240 of FIG. 20 and the second seal cartridge 272 is similar to the single seal cartridge assembly 240 of FIG. 17. The two cartridges are mounted in series to form a three seal assembly cartridge 240 of the present embodiment. In the present embodiment, the space 262 between the second seal assembly 100b and the third sealing assembly 100c may also be filled with a lubricant. In one embodiment, the sealing component 102 of the first sealing assembly 100a is made from a rigid thermoplastic material, such as an engineered plastic like PEEK, PC or the like, the sealing component 102 of the second sealing assembly 100b is made of a PTFE, PTFE based material, or the like, and the sealing component 102 of the third seal assembly 100c made of a PBI (polybenzimidazole) based material or the like, which has reduced sealing ability at lower temperatures but increased sealing ability at higher temperatures. In applications where the sealing cartridge assembly 240 seals mud based media and is subjected to high pressure and high temperature, the first sealing assembly 100a would act as a barrier by preventing abrasive mud particles from reaching and thus damaging the second sealing assembly 100b. Upon failure of the first and second sealing assemblies 100a, 100b, the third sealing assembly 100c would provide appropriate sealing because of already being operating at higher temperatures.

The seal assemblies of the present embodiment may also incorporate an anti-extrusion ring 120 or alternatively an integrated lubricating area 238 similar to that of FIG. 15.

FIG. 22 shows a seal cartridge 240 comprising a sleeve housing or cartridge housing 242 having three seal assemblies 100 located therein, which include a first seal assembly 100a, a second sealing assembly 100b, and a third seal assembly 100c. The entire seal cartridge 240 is configured to be installed over a shaft 116 and inside a cavity of an equipment housing. The present seal cartridge assembly 240 resembles the seal cartridge assembly of FIG. 21 with a few exceptions. In the present embodiment, the cartridge housing 242 is a single piece housing and not formed by stacking two separate housing sections in series. The present cartridge housing 241 has an open end 256 and a closed end 280 comprising an end wall 282. The cartridge housing 242 also has a variable inner diameter. As shown, the housing has at least three inside diameter sections 284, 286, 288, which allows for precisely locating the three sealing assemblies 100a, 100b, 100c in their positions. Further two of the sections form internal shoulders 290, 292 to at least partially back or support the first seal assembly 100a and the second seal assembly 100b from media pressure. The third seal assembly 100c is back or supported by the end wall 282. As shown in this figure, the variable inner diameter 284, 286, 288 results in the sealing assemblies 100 having different outer diameters but otherwise have similar seal components, which are also similar to the seal assemblies of FIGS. 17, 20 and 21.

Additionally, by incorporating three different internal diameters 284, 286, 288 to fit three different sized seal assemblies 100a, 100b, 100c, installation is aided by the present design. For example, the third seal assembly 100c can be installed first into the internal section of the cartridge housing 242 corresponding to the smallest diameter 288. In doing so, the third seal assembly 100c can slide past the first two internal diameter sections without interference or rubbing against the interior surfaces of those sections, as the outer diameter of the third seal assembly 100c is smaller than the internal diameters of those two sections. If the internal dimension of the cartridge housing 242 instead has a single internal diameter, it would require pushing the third seal assembly 100c a great distance with the locking component 132, the sealing component 102, and the supporting component 112 all rubbing against the internal diameter during installation for the entire length of the installation, which may not be possible or at least very difficult to do. The process can repeat by next installing the second seal assembly 100b into the mid internal diameter section 286 and then the first seal assembly 100a into the largest internal diameter section 284.

The seal assemblies of the present embodiment may also incorporate an anti-extrusion ring 120 or alternatively an integrated lubricating area 238 similar to that of FIG. 15.

FIG. 23 shows a seal cartridge 240 comprising a sleeve housing or cartridge housing 242 having three seal assemblies 100 located therein, which include a first seal assembly 100a, a second sealing assembly 100b, and a third seal assembly 100c, similar to the seal cartridge 240 of FIG. 22 with the following exceptions. In the present embodiment, the cartridge housing 242 is provided with openings or ports 298, 300 that allow for: (1) the lubricant in the spaces 260, 262 between the sealing assemblies to circulate or route outside of the cartridge housing and then returned, which helps cool the dynamic sealing areas; and/or (2) refilling these spaces with lubricant without having to remove the sealing cartridge to do so; and/or (3) pressurizing the lubricant. Pressurizing the lubricant may be utilized in high pressure applications to balance the full media pressure on the backside of the seal to create a relatively low pressure differential, which can improve service life.

FIG. 24 shows a seal cartridge assembly 240 comprising a first seal cartridge 270 and a second seal cartridge 272 mounted in series and over a shaft 116. The sealing cartridge assembly 240 of the present embodiment is similar to seal cartridge assembly of FIG. 21 but where both the first seal assembly 100a and the second sealing assembly 100b are backed by a wall. Like the embodiment of FIG. 21, the first seal assembly 100a is supported by the radially inwardly protruding wall 251 that protrudes from a first cartridge housing 242a. The second seal assembly 100b is supported by a radially inwardly protruding wall 251 but from a second cartridge housing 242b that is placed in series with the first cartridge housing 242a. The wall 251 of the second cartridge housing 242b has a portion that projects radially inwardly towards the bore of the cartridge assembly but also a portion that extends axially into the first cartridge housing 242a. As shown, the wall extends axially into the open end of the first cartridge housing 242a. By supporting the first seal assembly 100a and the second seal assembly 100b from media pressure coming from the side opposite the walls, the walls help withstand increased or high media pressures. In service, the third seal assembly 100c would be downstream of the media pressure and therefore may not require a supporting wall, although one can be added. The two cartridge housings 242a, 242b may be threadedly engaged with one another. In other examples, the engagement may be accomplished by other means, such as by press fit. Further, the cartridge housings 242a, 242b may incorporate grooves to accommodate O-rings and energizer springs, as shown in FIGS. 20-23.

FIG. 25 shows a cartridge seal assembly 240 with a cartridge housing 242 and a single seal assembly 100, similar to the embodiment of FIG. 17 with a few exceptions. In the present embodiment, the seal assembly 100 has a spring energizer 128 that is a V-spring. V-spring may be used for fluids with high suspended solids, such as dirt and grimes. Because a V-spring is more open than a canted coil spring with a plurality of canted coils, dirt and grimes are less susceptible to deposit and stick to the V-spring, which may improve the performance of the sealing assembly 240 in certain applications. Other spring energizers may also be used, such as garter springs, ribbon springs, etc.

FIG. 26 shows a seal cartridge or cartridge seal assembly 240 similar to that of FIG. 21 with a few exceptions. In the present embodiment, the spring energizers 128 of the first seal assembly 100a and the second seal assembly 100b are V-springs, similar to the V-spring of FIG. 25. However, the third seal assembly 100c does not incorporate an energizer cavity or an energizer. The third seal assembly 100c relies on the media pressure and the expansion of the seal component 102 at increased temperature to provide appropriate sealing. For all three sealing assemblies 100a, 100b, 100c, other means to energize the dynamic sealing area may be used, such as garter springs, ribbon springs, etc. Note that in a multi-seal assembly application, the last seal assembly may not include a canted coil spring, as shown with reference to FIG. 26. All the sealing assemblies and cartridge seal assemblies presented herein are configured to provide dynamic sealing with a moving shaft However, the same assemblies may be piston mounted for an axially movable shaft.

As discussed in the various embodiments presented above, the deflection of the inner arm 114 of the supporting component is minimized by using a material with a relatively high elastic modulus and sizing the arm to be relatively thick. By minimizing the deflection of the arm 114, at least an end portion of the arm can have a reduced clearance with the shaft and not expected to touch the shaft. However, in the event of a potential touching, aspects of the present disclosure provide for use of anti-extrusion rings 120, such as that shown in FIGS. 1-14, or incorporating an integrated lubricating area 238 into the inner arm 114, as shown and discussed with reference to FIG. 15.

Still further, an aspect of the present disclosure is understood to include a sealing area 126 on each sealing component of the various sealing assemblies disclosed being efficiently energized by an energizer 128 and properly supported by the inner arm 114 of a supporting component, which allows for reduced sealing areas compared to prior art seal assemblies. A reduced sealing area 126 may be of interest because it may be cooled and lubricated more easily than an enlarged sealing area and may also provide better sealing. However, depending on the application, an enlarged sealing area, larger than the disclosed small sealing areas 126, may also be of interest.

Regarding sealing cartridges with two or more seal assemblies mounted in series, in general, the purpose of the first sealing assembly 100a, i.e., the one that faces the media fluid and pressure first, is to extend the seal life of the second sealing assembly 100b and subsequent seal assemblies, if any, by protecting the second and any subsequent seal assembly from the abrasive media particles. Thus, in some embodiments with two or more seal assemblies mounted in series, the first seal assembly 100a preferably incorporates a sealing component made from a relatively more rigid thermoplastic material, such as an engineered plastic like PEEK or PC. When a third sealing assembly 100c is incorporated, the third assembly 100c serves as a backup seal for the second sealing assembly 100b in order to further extend the life of the sealing cartridge 240.

The sealing assemblies and sealing cartridges discussed herein are suitable for but not limited to high pressure and high temperature applications as well as many other applications, including in low pressure applications. Additionally, the sealing assemblies and sealing cartridges, in which seal assemblies are mounted in cartridge housings, may be used in pressure compensating systems embedded into downhole tools used in the oil and gas industry.

Although limited embodiments of the seal assemblies and seal cartridges and their components have been specifically described and illustrated herein, many modifications and variations will be apparent to those skilled in the art. For example, the various seal assemblies with separate anti-extrusion rings may be used with seal cartridges and may incorporate different energizers than canted coil springs, etc. Furthermore, it is understood and contemplated that features specifically discussed for one seal assembly embodiment may be adopted for inclusion with another seal assembly embodiment, provided the functions are compatible. For example, in embodiments with a V-spring, the supporting component may incorporate anti-extrusion rings. Accordingly, it is to be understood that the seal assemblies and cartridges and their components constructed according to principles of the disclosed device, system, and method may be embodied other than as specifically described herein. The disclosure is also defined in the following claims.

What is claimed is:

1. A sealing assembly to provide sealing between a shaft and a housing comprising:
   a sealing component comprising a body section, an outer flange, and an inner flange both extending from said body section, said inner flange comprising a sealing area and a sealing lip;
   a supporting component receiving said sealing component and comprising an inner arm comprising an inner arm stub projecting under said sealing component, said inner arm stub providing a supporting area spanning an inner portion of said body section and a first portion of said inner flange of said sealing component and comprises an inner arm edge;
   an anti-extrusion ring engaged to said inner arm stub, said anti-extrusion ring comprising an inner surface;
   wherein said inner arm edge of said inner arm stub defining a first inside diameter and said inner surface of said anti-extrusion ring defining a second inside diameter, and wherein the second inside diameter is smaller than the first inside diameter so that when the sealing assembly is mounted on a shaft, said second inside diameter has a smaller clearance than said first inside diameter with the shaft.

2. The sealing assembly of claim 1, wherein said anti-extrusion ring spans a second portion of said inner flange of said sealing component.

3. The sealing assembly of 2, wherein said first portion of said inner flange has a length and said second portion of said inner flange has a length and wherein the two lengths are equal.

4. The sealing assembly of claim 2, wherein said first portion of said inner flange has a length and said second portion of said inner flange has a length and wherein the length of said second portion is less than the length of said first portion of said inner flange by at least 25%.

5. The sealing assembly claim 1, further comprising a locking ring mechanically engaged with said outer flange of said sealing component.

6. The sealing assembly of claim 5, wherein said retaining component comprises a spring lip.

7. The sealing assembly of claim 1, wherein said anti-extrusion component and said inner arm stub are engaged by a snap fit arrangement.

8. The sealing assembly of claim 1, wherein said anti-extrusion component and said inner arm stub are engaged by a pressed fit arrangement.

9. The sealing assembly claim 1, further comprising a spring energizer energizing the sealing area.

10. The sealing assembly of claim 9, wherein said spring energizer is a canted coil spring.

11. The sealing assembly of claim 10, wherein said canted coil spring is radial canted coil spring having a major axis turned at an angle with respect to a longitudinal axis of said sealing assembly.

12. The sealing assembly of claim 10, wherein said canted coil spring contacts said inner flange at an area where the inner flange is supported by both the inner arm stub and the anti-extrusion ring.

13. The sealing assembly of claim 9, wherein said spring energizer is a cantilever spring, a ribbon spring, or a garter spring.

14. The sealing assembly of claim 1, wherein said anti-extrusion ring is made of plastic.

15. The sealing assembly of claim 14, wherein said plastic is a high temperature engineered plastic.

16. The sealing assembly of claim 1, wherein said anti-extrusion ring is made of a relatively low elastic modulus metal, which has a lower elastic modulus value than that of the supporting component.

17. The sealing assembly of one of claim 16, wherein said relatively low elastic metal is one of bronze and bronze alloy.

18. The sealing assembly of claim 1, further comprising a cartridge housing comprising a cavity and wherein the sealing assembly is positioned inside the cavity of the cartridge housing.

19. A sealing assembly to provide sealing between a shaft and a housing comprising:
 a sealing component comprising a body section, an outer flange, and an inner flange both extending from said body section, said inner flange comprising a sealing area and a sealing lip;
 a supporting component made of a first material having a first modulus of elasticity value receiving said sealing component and comprising an inner arm projecting into said sealing component, said inner arm providing a supporting area spanning an inner portion of said body section and at least a portion of said inner flange;
 a locking ring engaging the outer flange of the sealing component and together with the sealing component defining an energizer cavity;
 a spring energizer disposed in the energizer cavity and biasing against the inner flange and the locking ring;
 wherein the inner arm has an inner arm edge defining a first inside diameter and a reduced clearance area defining a second inside diameter, which is smaller than the first inside diameter, and wherein the reduced clearance area has a second material having a second modulus of elasticity value, which is lower than the first modulus of elasticity value.

20. The sealing assembly of claim 19, wherein the reduced clearance area is part of an anti-extrusion ring engaged to an inner arm stub of the inner arm.

21. The sealing assembly of claim 20, wherein said anti-extrusion ring is made of plastic.

22. The sealing assembly of claim 21, wherein said plastic is a high temperature engineered plastic.

23. The sealing assembly of claim 20, wherein said anti-extrusion ring is engaged to the inner arm stub by a snap fit or a press fit.

24. The sealing assembly of claim 19, wherein the second material having the second modulus of elasticity value comprises one or more inserts positioned inside one or more bores.

25. The sealing assembly of claim 24, wherein the one or more bores are open ended at each end of each bore.

26. The sealing assembly of claim 24, wherein the one or more bores have at least one end of each bore that is closed.

27. The sealing assembly of claim 24, wherein said spring energizer contacts said inner flange at a portion of the inner flange that is supported by the inner arm and the reduced clearance area of the inner arm.

28. The sealing assembly of claim 19, wherein said spring energizer is a canted coil spring, a ribbon spring, a helical spring, or a V-spring.

29. The sealing assembly of 19, further comprising a cartridge housing comprising an interior cavity and wherein the sealing assembly is positioned inside the interior cavity of the cartridge housing.

30. The sealing assembly of 29, further comprising a second sealing assembly positioned inside the interior cavity of the cartridge housing in series with the sealing assembly.

31. The sealing assembly of claim 30, wherein the second sealing assembly comprises a sealing component comprising an inner flange having a sealing lip supported by an inner arm of a supporting component.

32. A method for making a seal assembly comprising:
 forming a sealing component comprising a body section, an outer flange, and an inner flange both extending from said body section, said inner flange comprising a sealing area and a sealing lip;
 placing a supporting component made of a first material having a first modulus of elasticity value in receiving arrangement with said sealing component, said supporting component comprising an inner arm projecting into said sealing component and providing a supporting area spanning an inner portion of said body section and at least a portion of said inner flange;
 placing a locking ring in engagement with the outer flange of the sealing component and forming an energizer cavity with said sealing component;
 placing a spring energizer in the energizer cavity and biasing the spring energizer against the inner flange and the locking ring;
 wherein the inner arm has an inner arm edge defining a first inside diameter and a reduced clearance area defining a second inside diameter, which is smaller than the first inside diameter, and wherein the reduced clearance area has a second material having a second modulus of elasticity value, which is lower than the first modulus of elasticity value.

33. The method of claim 32, wherein the reduced clearance area is part of an anti-extrusion ring engaged to an inner arm stub of the inner arm.

34. The method of claim 33, wherein said anti-extrusion ring is made of plastic.

35. The method of claim 34, wherein said plastic is a high temperature engineered plastic.

36. The method of claim 33, wherein said anti-extrusion ring is engaged to the inner arm stub by a snap fit or a press fit.

37. The method of claim 32, wherein the second material having the second modulus of elasticity value comprises one or more inserts positioned inside one or more bores.

38. The method of claim 37, wherein the one or more bores are open ended at each end of each bore.

39. The method of claim 37, wherein the one or more bores have at least one end of each bore that is closed.

40. The method of claim 37, wherein said spring energizer contacts said inner flange at a portion of the inner flange that is supported by the inner arm and the reduced clearance area of the inner arm.

41. The method of claim 32, wherein said spring energizer is a canted coil spring, a ribbon spring, a helical spring, or a V-spring.

42. The method of claim 41, wherein the canted coil spring has a major axis and wherein the major axis is generally parallel with a lengthwise axis of the sealing assembly.

43. The method of 32, further comprising placing the seal assembly inside an interior cavity of a cartridge housing.

44. The method of 43, further comprising placing a second sealing assembly inside the interior cavity of the cartridge housing in series with the sealing assembly.

45. The method of claim 44, wherein the second sealing assembly comprises a sealing component comprising an inner flange having a sealing lip supported by an inner arm of a supporting component.

* * * * *